United States Patent
Wentink

(10) Patent No.: US 8,976,741 B2
(45) Date of Patent: Mar. 10, 2015

(54) PIGGYBACKING INFORMATION IN TRANSMIT OPPORTUNITIES

(75) Inventor: Maarten Menzo Wentink, Utrecht (NL)

(73) Assignee: QUALCOMM Incorporated, San Diego, CA (US)

(*) Notice: Subject to any disclaimer, the term of this patent is extended or adjusted under 35 U.S.C. 154(b) by 613 days.

(21) Appl. No.: 12/711,861

(22) Filed: Feb. 24, 2010

(65) Prior Publication Data

US 2010/0220678 A1 Sep. 2, 2010

Related U.S. Application Data

(60) Provisional application No. 61/156,353, filed on Feb. 27, 2009.

(51) Int. Cl.
  *H04W 28/16* (2009.01)
  *H04W 72/12* (2009.01)
  *H04W 74/08* (2009.01)

(52) U.S. Cl.
  CPC ...... *H04W 72/1289* (2013.01); *H04W 72/1284* (2013.01); *H04W 74/085* (2013.01)
  USPC .......................................... 370/329; 370/330

(58) Field of Classification Search
  USPC ........................................................ 370/329
  See application file for complete search history.

(56) References Cited

U.S. PATENT DOCUMENTS

| 7,352,718 | B1 | 4/2008 | Perahia et al. | |
|---|---|---|---|---|
| 7,995,525 | B1* | 8/2011 | Perahia et al. | 370/329 |
| 2005/0089064 | A1* | 4/2005 | Zimmerman et al. | 370/468 |
| 2005/0141495 | A1 | 6/2005 | Lin et al. | |
| 2005/0285719 | A1* | 12/2005 | Stephens | 340/10.2 |
| 2006/0002336 | A1 | 1/2006 | Stanwood et al. | |
| 2006/0126660 | A1 | 6/2006 | Denney et al. | |
| 2006/0133272 | A1* | 6/2006 | Yuan et al. | 370/230 |
| 2006/0248429 | A1* | 11/2006 | Grandhi et al. | 714/749 |
| 2006/0291436 | A1 | 12/2006 | Trainin | |
| 2007/0058605 | A1 | 3/2007 | Meylan et al. | |
| 2007/0189207 | A1 | 8/2007 | Sammour et al. | |
| 2008/0018681 | A1 | 1/2008 | Lin et al. | |
| 2008/0181162 | A1* | 7/2008 | Stephens et al. | 370/312 |
| 2008/0186861 | A1* | 8/2008 | Becker | 370/236 |
| 2009/0167659 | A1 | 7/2009 | Kim et al. | |
| 2010/0002677 | A1 | 1/2010 | Lin et al. | |
| 2010/0220679 | A1* | 9/2010 | Abraham et al. | 370/329 |
| 2011/0096710 | A1* | 4/2011 | Liu et al. | 370/312 |

FOREIGN PATENT DOCUMENTS

WO  WO2005015844  2/2005

OTHER PUBLICATIONS

Yoo et al., "Computer Communications, vol. 31, issue 14 Joint uplink/downlink opportunistic scheduling for Wi-Fi WLANs," Sep. 5, 2008, Elsevier Science Publishers B. V. Amsterdam, vol. 31, issue 14, section 5.2 data transmission.*

(Continued)

*Primary Examiner* — Huy D Vu
*Assistant Examiner* — Teisha D Hall
(74) *Attorney, Agent, or Firm* — Kevin T. Cheatham

(57) ABSTRACT

Aspects of the present disclosure provide techniques for aggregating certain frame types in uplink and/or downlink transmit opportunities. Such techniques may improve wireless communications system performance by reducing the overall number of transmit opportunities required.

50 Claims, 18 Drawing Sheets

(56) References Cited

OTHER PUBLICATIONS

"Computer Communications, vol. 31, issue 14 Joint uplink/downlink opportunistic scheduling for Wi-Fi WLANs," Sep. 5, 2008, hereinafter, Yoo et al.*

Andreas Willig: "Recent and Emerging Topics in Wireless Industrial Communications: A Selection" IEEE Transactions on Industrial Informatics, IEEE Service Center, New York, NY, US, vol. 4, No. 2, May 1, 2008, pp. 102-124, XP011215124 ISSN:.

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specificatio.

International Search Report and Written Opinion—PCT/US2010/025672, International Search Authority—European Patent Office—Jun. 24, 2010.

Skordoulis D et al: "IEEE 802.11n MAC frame aggregation mechanisms for next-generation high-throughput WLANs [medium access control protocols for wireless LANs]" IEEE Wireless Communications, IEEE Service Center, Piscataway, NJ, US, vol. 14, No. 1, Feb. 1.

Taiwan Search Report—TW099105883—TIPO—Jan. 21, 2013.

* cited by examiner

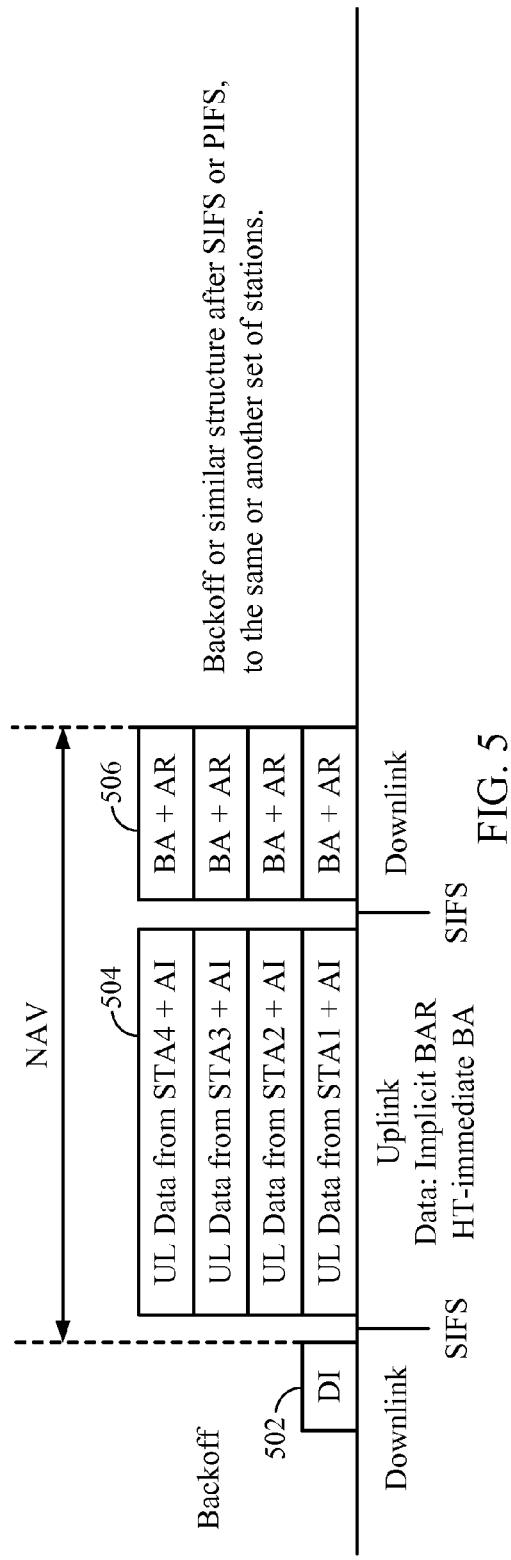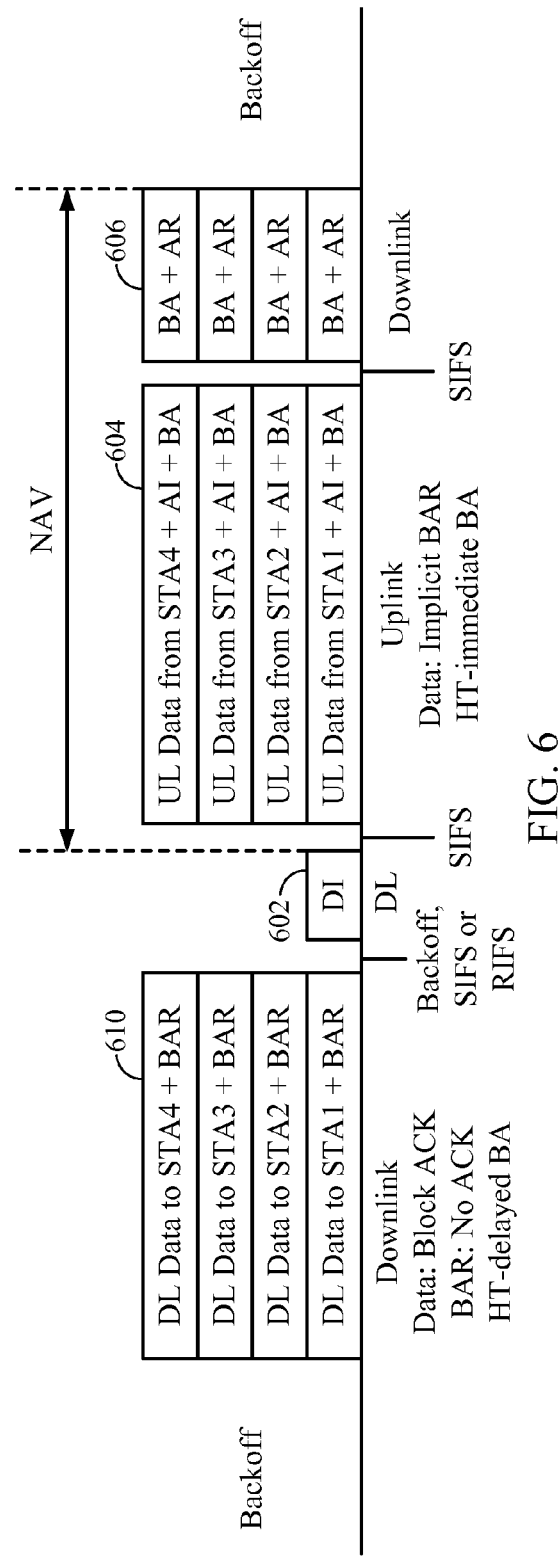

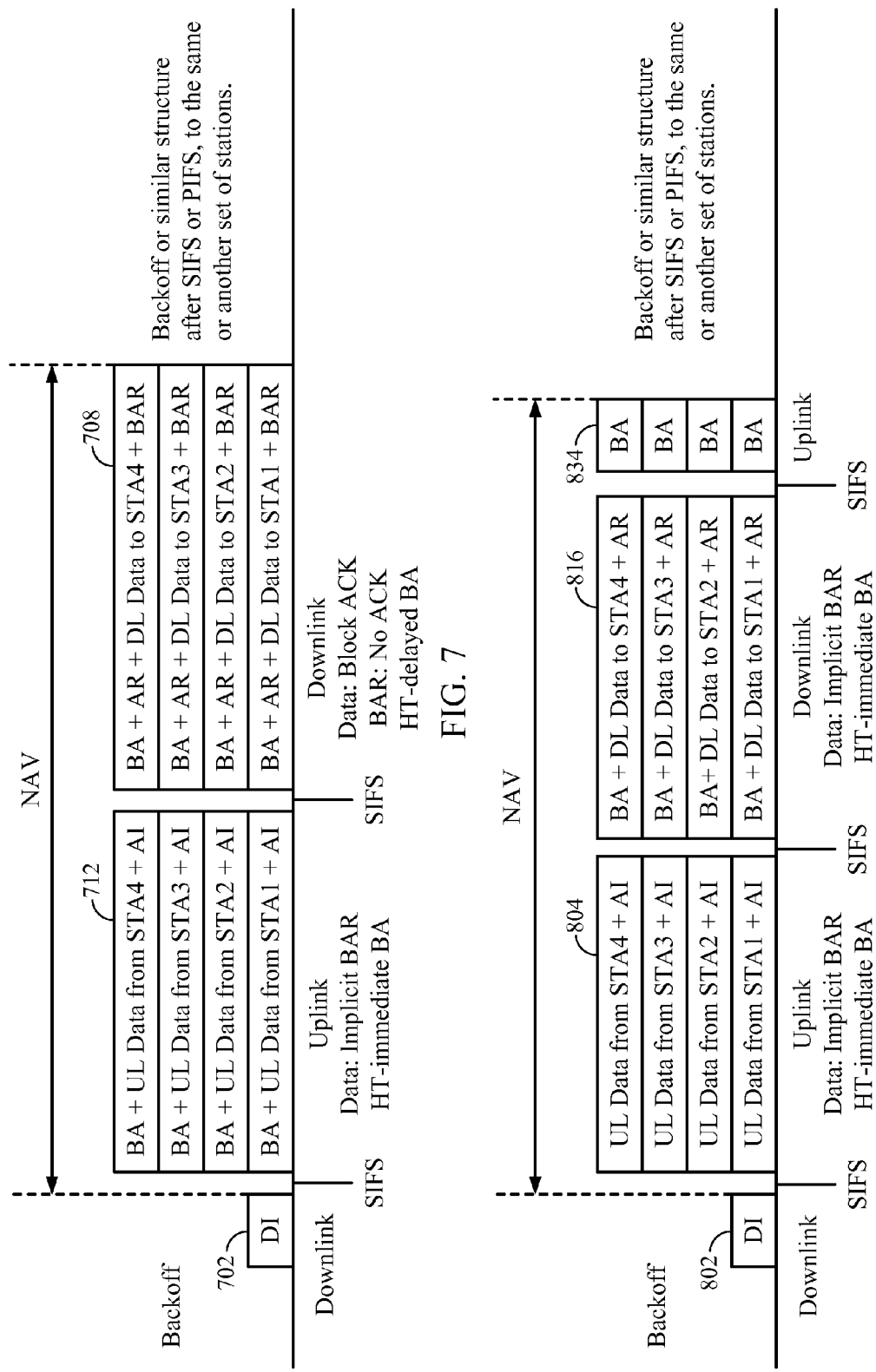

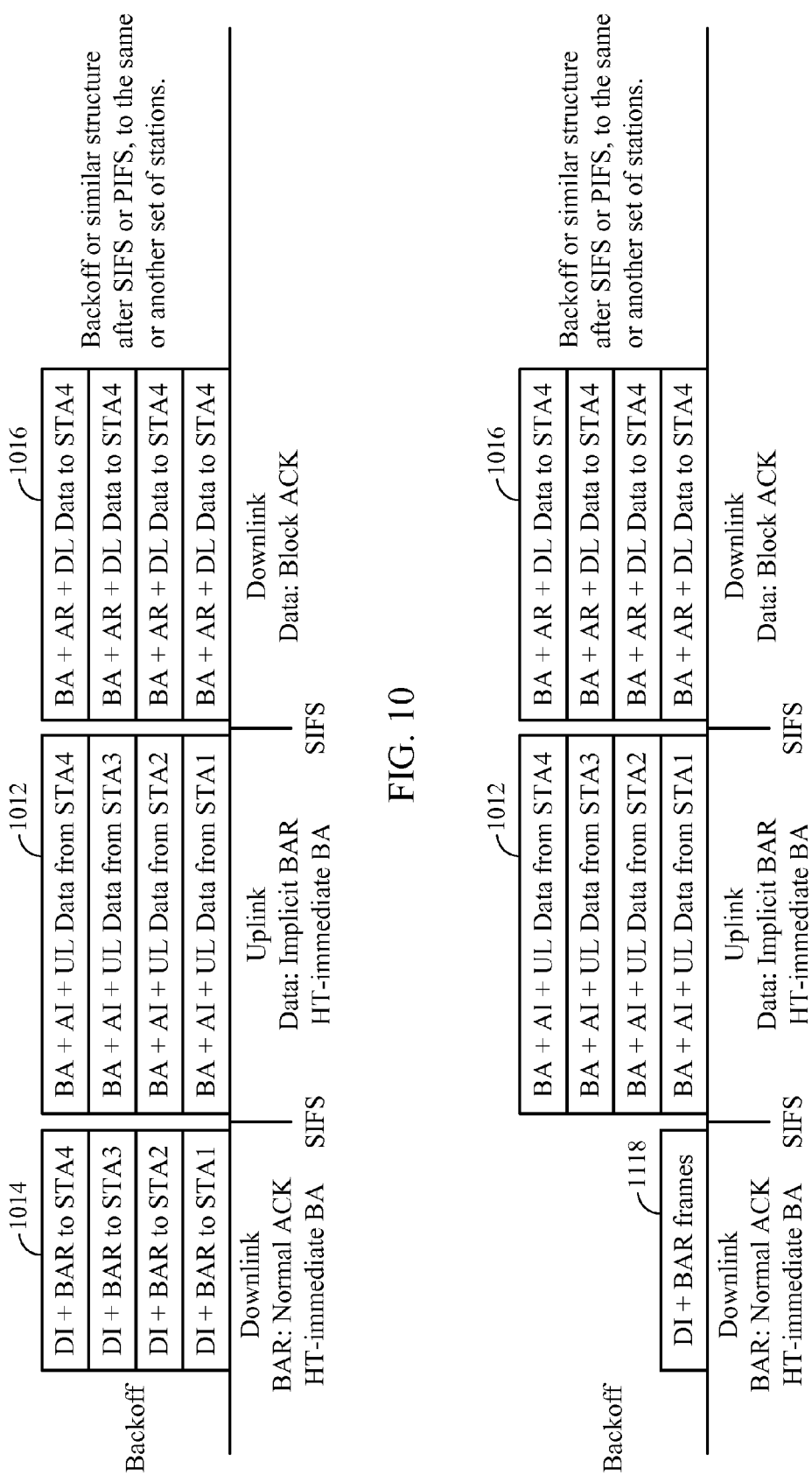

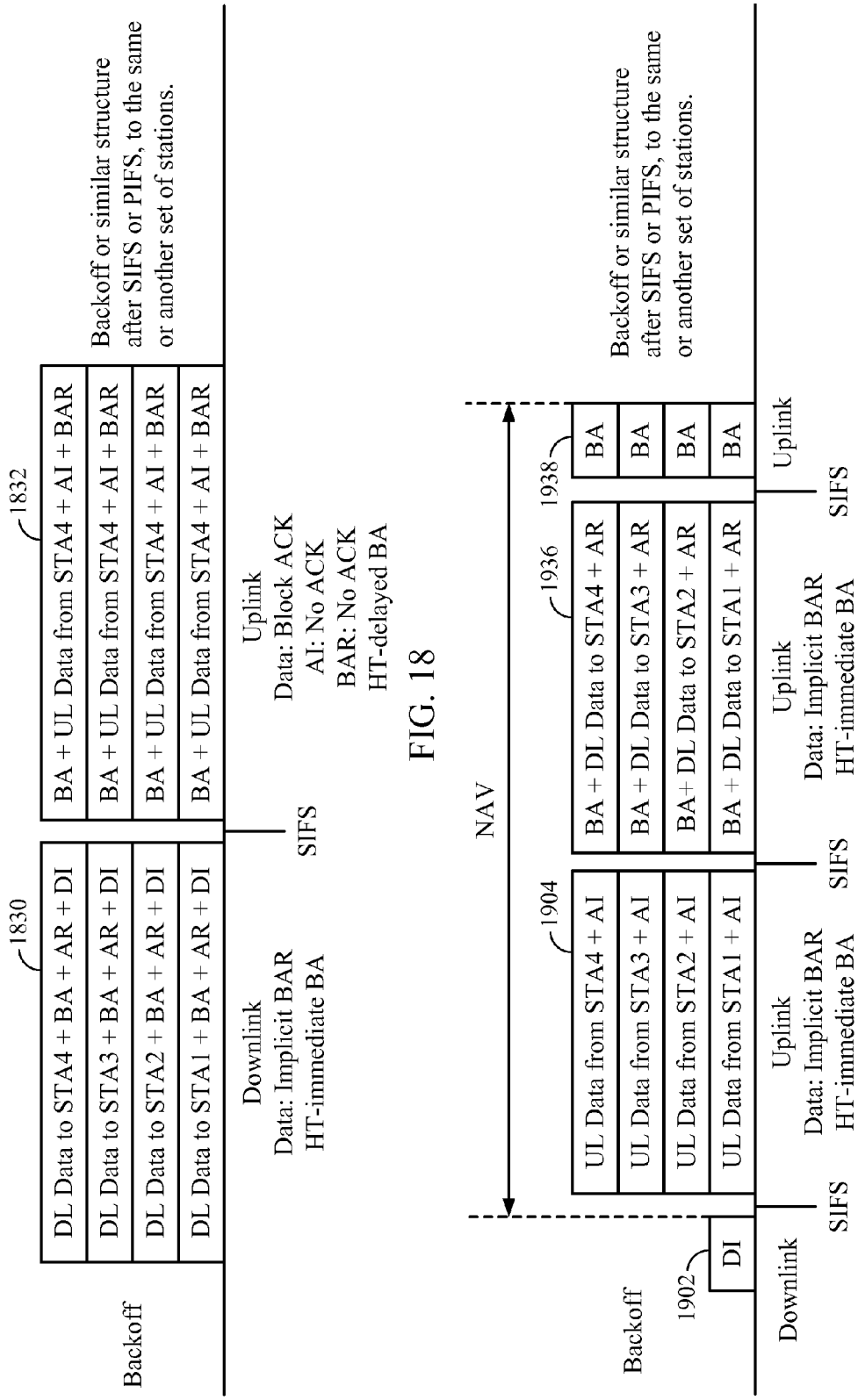

| AI Action (No ACK) | | | AI Action (No ACK) - encrypted | | |
|---|---|---|---|---|---|
| fc | 2 | octets | fc | 2 | octets |
| dur | 2 | octets | dur | 2 | octets |
| da | 6 | octets | da | 6 | octets |
| sa | 6 | octets | sa | 6 | octets |
| bssid | 6 | octets | bssid | 6 | octets |
| sc | 2 | octets | sc | 2 | octets |
| category | 1 | octets | ccmp hdr | 8 | octets |
| action | 1 | octets | category | 1 | octets |
| rss | 1 | octets | action | 1 | octets |
| fcs | 4 | octets | rss | 1 | octets |
| | | | mic | 8 | octets |
| | | | fcs | 4 | octets |

FIG. 22

| AR Action (No ACK) | | | AR Action (No ACK) - encrypted | | |
|---|---|---|---|---|---|
| fc | 2 | octets | fc | 2 | octets |
| dur | 2 | octets | dur | 2 | octets |
| da | 6 | octets | da | 6 | octets |
| sa | 6 | octets | sa | 6 | octets |
| bssid | 6 | octets | bssid | 6 | octets |
| sc | 2 | octets | sc | 2 | octets |
| category | 1 | octets | ccmp hdr | 8 | octets |
| action | 1 | octets | category | 1 | octets |
| gss | 1 | octets | action | 1 | octets |
| fcs | 4 | octets | gss | 1 | octets |
| | | | mic | 8 | octets |
| | | | fcs | 4 | octets |

FIG. 23

| DI Action (No ACK) frame | | |
|---|---|---|
| fc | 2 | octets |
| dur | 2 | octets |
| da | 6 | octets |
| sa | 6 | octets |
| bssid | 6 | octets |
| sc | 2 | octets |
| category | 1 | octets |
| action | 1 | octets |
| di info | 7 | octets |
| fcs | 4 | octets |
| total | 37 | octets |

2602

| DI Action (No ACK) frame - encrypted | | |
|---|---|---|
| fc | 2 | octets |
| dur | 2 | octets |
| da | 6 | octets |
| sa | 6 | octets |
| bssid | 6 | octets |
| sc | 2 | octets |
| ccmp hdr | 8 | octets |
| category | 1 | octets |
| action | 1 | octets |
| di info | 7 | octets |
| mic | 8 | octets |
| fcs | 4 | octets |
| total | 53 | octets |

PIGGYBACKING INFORMATION IN TRANSMIT OPPORTUNITIES

CLAIM OF PRIORITY UNDER 35 U.S.C. §119

The present application for patent claims benefit of U.S. Provisional Patent Application No. 61/156,353, entitled, "PIGGYBACKING INFORMATION IN TRANSMIT OPPORTUNITIES," filed Feb. 27, 2009 assigned to the assignee hereof and hereby expressly incorporated by reference herein.

TECHNICAL FIELD

Certain aspects of the present disclosure generally relate to wireless communications using technologies that allow multiple access, such as spatial division multiple access (SDMA) systems.

BACKGROUND

In order to address the issue of increasing bandwidth requirements demanded for wireless communication systems, different schemes are being developed to allow multiple user terminals to communicate with a single base station by sharing the same channel (same time and frequency resources) while achieving high data throughputs. Spatial Division Multiple Access (SDMA) represents one such approach that has recently emerged as a popular technique for the next generation communication systems.

In SDMA systems, a base station may transmit or receive different signals to or from a plurality of mobile user terminals at the same time and using the same frequency. In order to achieve reliable data communication, user terminals may need to be located in sufficiently different directions. Independent signals may be simultaneously transmitted from each of multiple space-separated antennas at the base station. Consequently, the combined transmissions may be directional, i.e., the signal that is dedicated for each user terminal may be relatively strong in the direction of that particular user terminal and sufficiently weak in directions of other user terminals. Similarly, the base station may simultaneously receive on the same frequency the combined signals from multiple user terminals through each of multiple antennas separated in space, and the combined received signals from the multiple antennas may be split into independent signals transmitted from each user terminal by applying the appropriate signal processing technique.

A multiple-input multiple-output (MIMO) wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In a multiple-access MIMO system based on SDMA, an access point can communicate with one or more user terminals at any given moment. If the access point communicates with a single user terminal, then the $N_T$ transmit antennas are associated with one transmitting entity (either the access point or the user terminal), and the $N_R$ receive antennas are associated with one receiving entity (either the user terminal or the access point). The access point can also communicate with multiple user terminals simultaneously via SDMA. For SDMA, the access point utilizes multiple antennas for data transmission and reception, and each of the user terminals typically utilizes less than the number of access point antennas for data transmission and reception. When SDMA is transmitted from an access point, $N_S = \min\{N_T, \text{sum}(N_R)\}$, where $\text{sum}(N_R)$ represents the summation of all user terminal receive antennas. When SDMA is transmitted to an access point, $N_S = \min\{\text{sum}(N_T), N_R\}$, where $\text{sum}(N_T)$ represents the summation of all user terminal transmit antennas.

SUMMARY

Certain aspects of the present disclosure provide a method for scheduling simultaneous transmissions of data from multiple wireless nodes in a wireless communications system. The method generally includes transmitting, to one or more wireless nodes, a downlink transmission containing an indication of a start of a first uplink transmit opportunity and receiving, during the first uplink transmit opportunity, uplink transmissions from the one or more stations comprising uplink data and a request for one or more uplink streams in a second uplink transmit opportunity.

Certain aspects of the present disclosure provide a method for scheduling transmissions of data from a wireless node to an access point in a wireless communications system. The method generally includes receiving, from the access point, a downlink transmission comprising an indication of a start of a first uplink transmit opportunity and transmitting, during the first uplink transmit opportunity, an uplink transmission comprising uplink data and a request for one or more uplink streams in a second uplink transmit opportunity.

Certain embodiments provide an apparatus for wireless communications. The apparatus generally includes a transmitter for transmitting, to one or more wireless nodes, a downlink transmission comprising an indication of a start of a first uplink transmit opportunity and a receiver for receiving, during the first uplink transmit opportunity, uplink transmissions from the one or more wireless nodes comprising uplink data and a request for one or more uplink streams in a second uplink transmit opportunity.

Certain embodiments provide an apparatus for wireless communications. The apparatus generally includes a receiver for receiving, from an access point, a downlink transmission comprising an indication of a start of a first uplink transmit opportunity and a transmitter for transmitting, during the first uplink transmit opportunity, an uplink transmission comprising uplink data and a request for one or more uplink streams in a second uplink transmit opportunity.

Certain embodiments provide an apparatus for wireless communications. The apparatus generally includes means for transmitting, to one or more wireless nodes, a downlink transmission comprising an indication of a start of a first uplink transmit opportunity and means for receiving, during the first uplink transmit opportunity, uplink transmissions from the one or more wireless nodes comprising uplink data and a request for one or more uplink streams in a second uplink transmit opportunity.

Certain embodiments provide an apparatus for scheduling transmissions of data from a wireless node to an access point in a wireless communications system. The apparatus generally includes means for receiving, from the access point, a downlink transmission comprising an indication of a start of a first uplink transmit opportunity and means for transmitting, during the first uplink transmit opportunity, an uplink transmission comprising uplink data and a request for one or more uplink streams in a second uplink transmit opportunity.

Certain aspects of the present disclosure provide a computer-program product for wireless communications, comprising a computer readable medium encoded with instructions. The instructions are generally executable to transmit, to one or more wireless nodes, a downlink transmission comprising an indication of a start of a first uplink transmit opportunity and receive, during the first uplink transmit opportunity, uplink transmissions from the one or more wireless nodes comprising uplink data and a request for one or more uplink streams in a second uplink transmit opportunity.

Certain aspects of the present disclosure provide a computer-program product for communication, comprising a computer readable medium encoded with instructions. The instructions are generally executable to receive, from the access point, a downlink transmission comprising an indication of a start of a first uplink transmit opportunity and transmit, during the first uplink transmit opportunity, an uplink transmission comprising uplink data and a request for one or more uplink streams in a second uplink transmit opportunity.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5-8 illustrate example frame exchange sequences in an SDMA system, in accordance with certain aspects of the present disclosure.

FIGS. 10-21 illustrate example frame exchange sequences in an SDMA system, in accordance with certain aspects of the present disclosure.

FIGS. 22-26 illustrate examples for formatting AI, AR and DI frames, in accordance with certain aspects of the present disclosure.

DETAILED DESCRIPTION

The word "exemplary" is used herein to mean "serving as an example, instance, or illustration." Any embodiment described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Certain aspects of the present disclosure provide techniques and apparatus that may be utilized schedule parallel transmissions, for example, as Spatial-Division Multiple Access (SDMA) transmit opportunities (TXOPs).

An Example Wireless Communication System

The word "exemplary" is used herein to mean "serving as an example, instance, or illustration." Any embodiment described herein as "exemplary" is not necessarily to be construed as preferred or advantageous over other aspects.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), and so on. Multiple user terminals can concurrently transmit/receive data via different (1) orthogonal code channels for CDMA, (2) time slots for TDMA, or (3) subbands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

Figure 1:
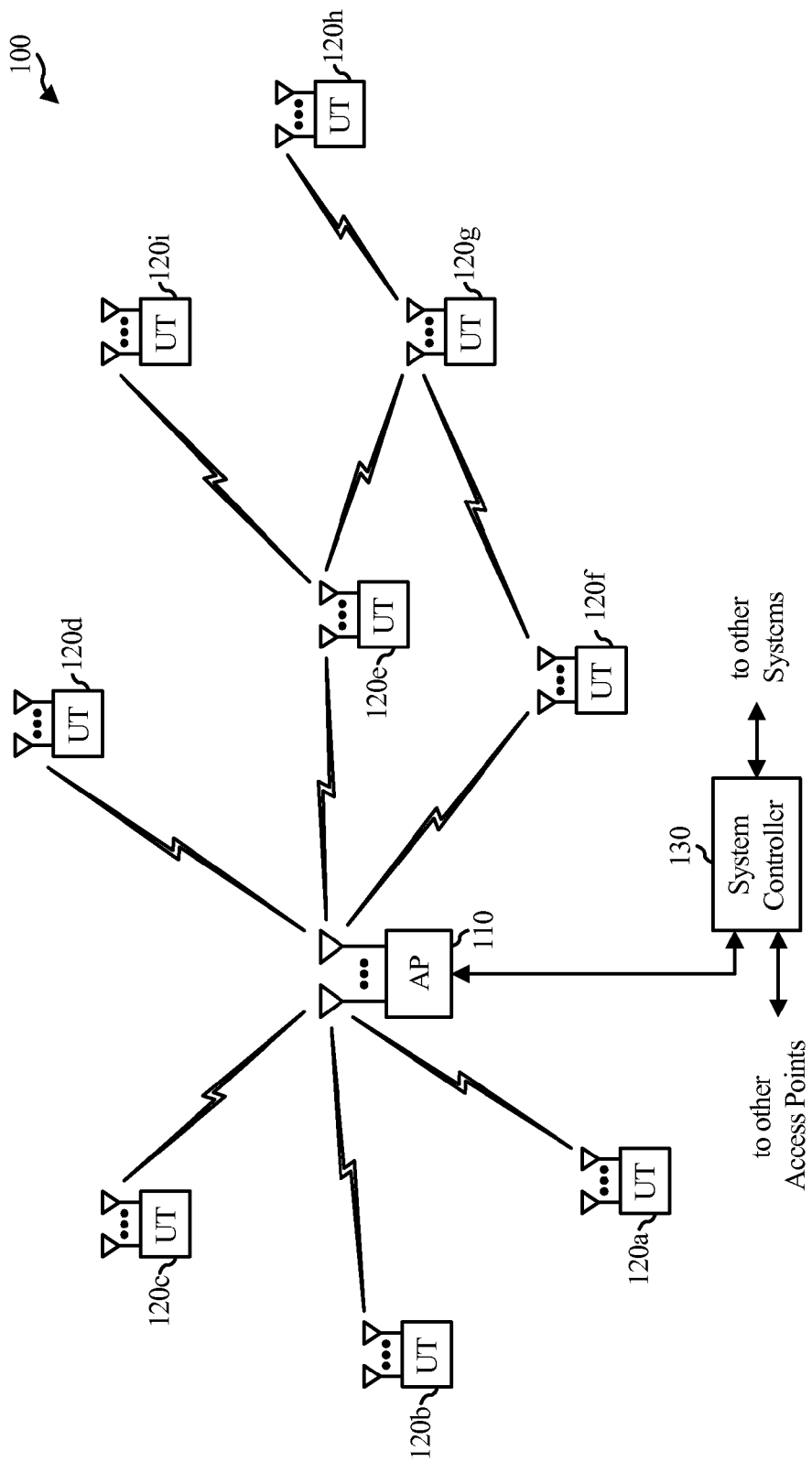
FIG. 1 illustrates a spatial division multiple access (SDMA) multiple input multiple output (MIMO) wireless system in accordance with certain aspects of the present disclosure.

FIG. 1 shows a multiple-access MIMO system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, simply a "station" or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via SDMA, for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

System 100 employs multiple transmit and multiple receive antennas for data transmission on the downlink and uplink. Access point 110 is equipped with $N_{ap}$ antennas and represents the multiple-input (MI) for downlink transmissions and the multiple-output (MO) for uplink transmissions. A set of $N_u$ selected user terminals 120 collectively represents the multiple-output for downlink transmissions and the multiple-input for uplink transmissions. For pure SDMA, it is desired to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
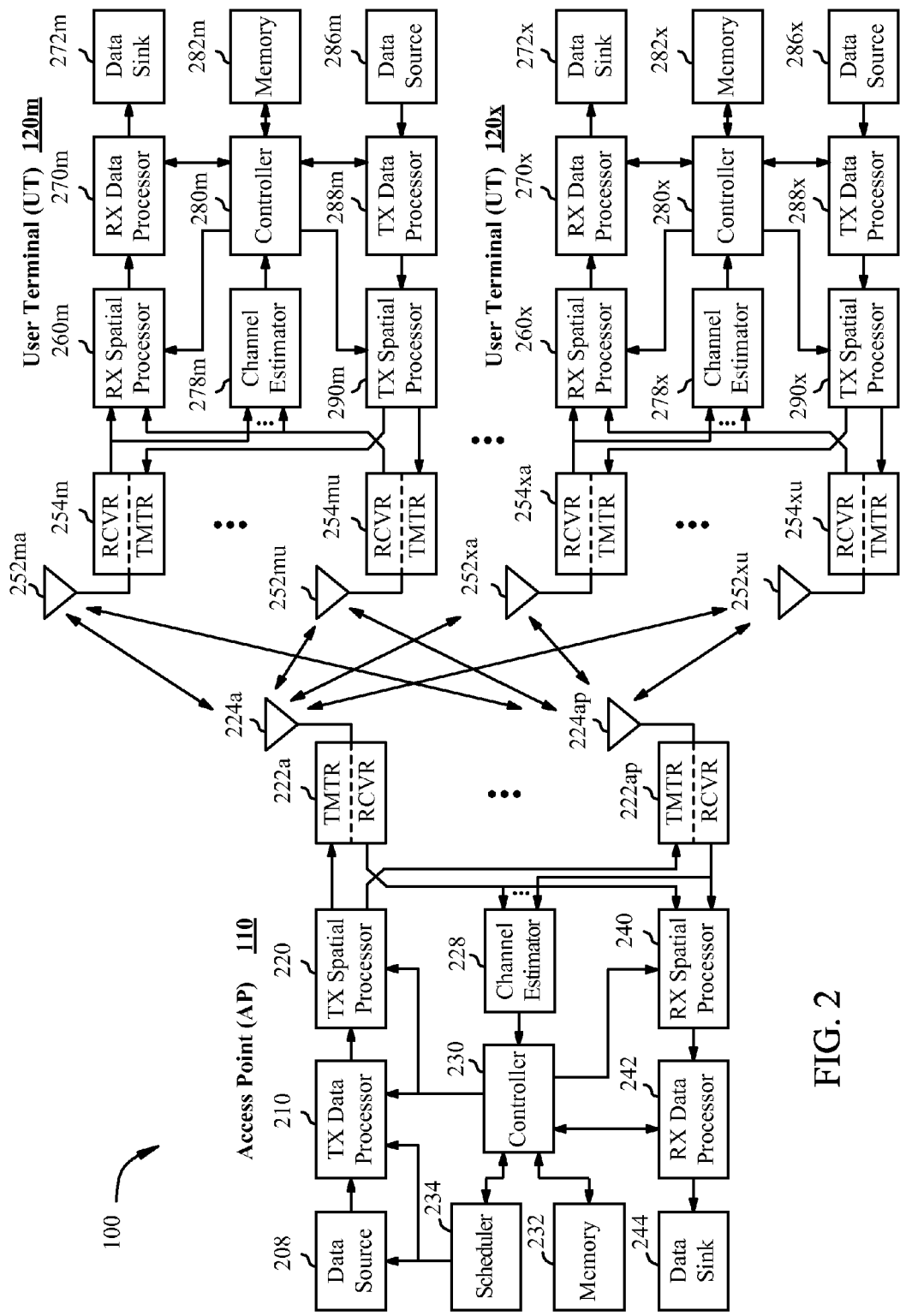
FIG. 2 illustrates a block diagram of an access point and two user terminals in accordance with certain aspects of the present disclosure.

FIG. 2 shows a block diagram of access point 110 and two user terminals 120m and 120x in MIMO system 100. Access point 110 is equipped with antennas 224a through 224t. User terminal 120m is equipped with antennas 252ma through 252mu, and user terminal 120x is equipped with antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink (i.e., $N_{up}$ user terminals may transmit to the AP simultaneously on the uplink via SDMA), $N_{dn}$ user terminals are selected for simultaneous transmission on the downlink (i.e., the AP may transmit to $N_{dn}$ user terminals simultaneously on the downlink via SDMA), $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides transmit symbol streams for the antennas. Each transmitter unit (TMTR) 254 receives and processes (e.g., converts to analog, amplifies, filters, and frequency upconverts) a respective transmit symbol stream to generate an uplink signal. transmitter units 254 provide uplink signals for transmission from antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the received symbol streams from receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides transmit symbol streams for the antennas. Each transmitter unit 222 receives and processes a respective transmit symbol stream to generate a downlink signal. transmitter units 222 providing downlink signals for transmission from antennas 224 to the user terminals.

At each user terminal 120, antennas 252 receive the downlink signals from access point 110. Each receiver unit 254 processes a received signal from an associated antenna 252 and provides a received symbol stream. An RX spatial processor 260 performs receiver spatial processing on received symbol streams from receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal, where the subscript m refers to the "$m^{th}$" user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
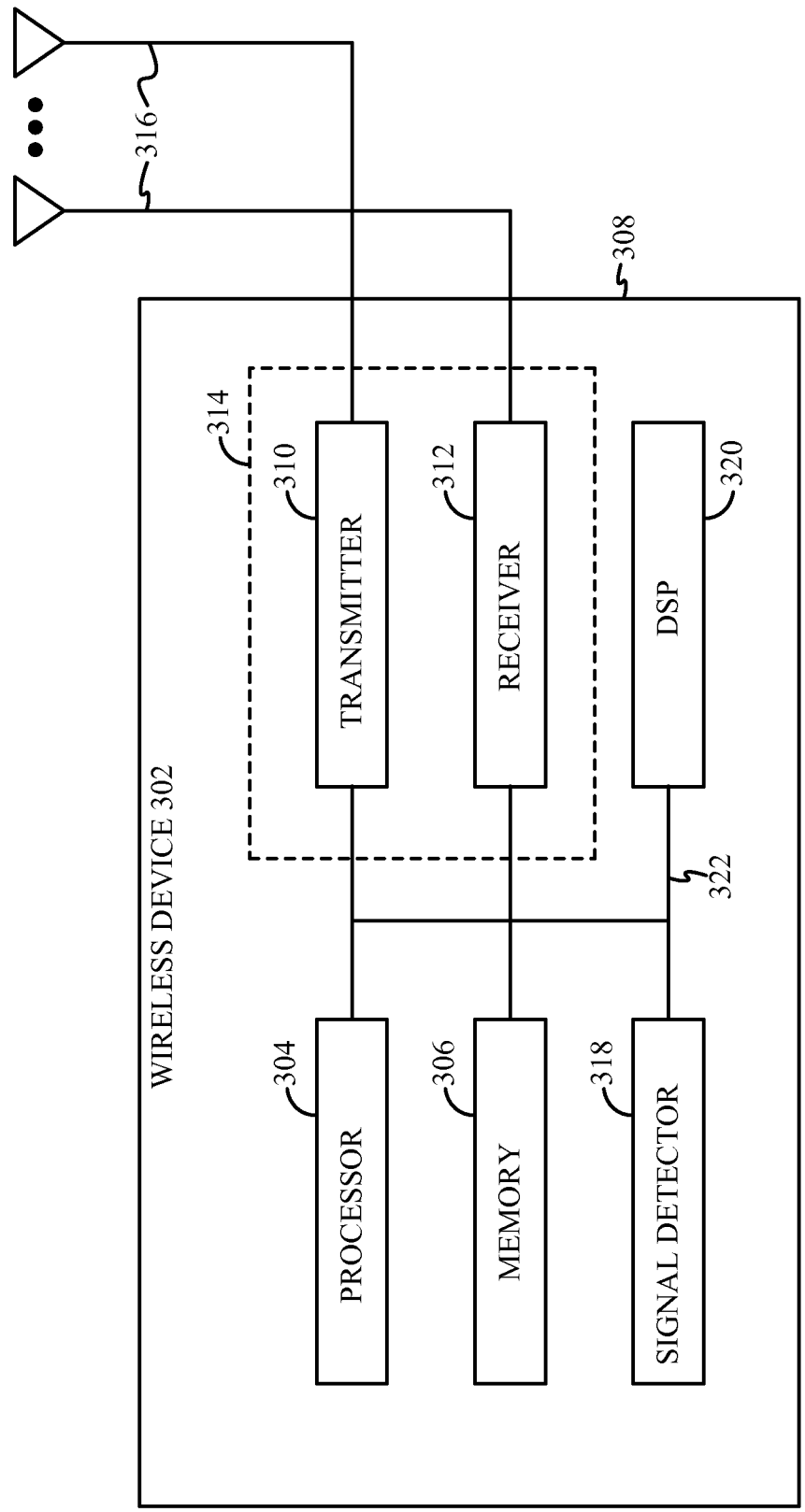
FIG. 3 illustrates various components that may be utilized in a wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be any type of wireless node, such as an access point (AP) or station (user terminal).

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

The wireless system shown in FIGS. 1-3 may be implemented as an SDMA system where antennas at the access point are located in sufficiently different directions, which insures no interference between simultaneously transmitted spatial streams dedicated to different user terminals. For certain aspects of the present disclosure, the wireless system shown in FIGS. 1-3 may refer to the multiuser system where a precoding (beamforming) of the transmission signal is applied providing orthogonality between spatial streams dedicated to different user terminals, while the access point antennas do not necessarily need to be located in sufficiently different directions.

In a Spatial Division Multiple Access (SDMA) scheme, uplink (UL) transmissions from multiple stations (STA) to an access point (AP) should be synchronized. UL transmissions should be synchronized in terms of arrival time at the AP, frequency, received power length of packets, and allocation of spatial streams.

Piggybacking Information in Transmit Opportunities (TXOPs)

According to certain aspects of the present disclosure, stations with data to send may send requests for uplink resources. For example, stations may send Allocation Indication (AI) frames to an Access Point (AP) to request spatial streams in an uplink SDMA Transmit Opportunity (TXOP). The AI frames may indicate the requested number of spatial streams in an uplink SDMA TXOP. The AP may respond to the AI frames with Allocation Response (AR) frames, which may specify the granted number of spatial streams.

According to certain aspects of the present disclosure, rather than send separate AI frames, stations may piggyback AI frames onto uplink TXOPs. In a similar manner, rather than send separate AR frames, an AP may piggyback AR frames onto downlink TXOPs. Piggybacking the AI frames on existing uplink TXOPs implies that no separate contention may be involved in requesting another TXOP. As a result, this approach may improve the efficiency of the SDMA system for continuous data streams. In other words, the increase in transmission time due to sending an additional AI or AR frame (on the order of micro-seconds) during an existing TXOP may be negligible relative to the duration of a separate TXOP (e.g., which may be 4 ms).

As will be described in greater detail below, piggybacked information (e.g., that might otherwise be contained in separate AI or AR frames) may be included in an existing TXOP in any suitable manner. For example, according to certain aspects, such information may be aggregated inside an Aggregated Media Access Control Protocol Data unit (A-MPDU). Alternatively, according to certain aspects, such information may be included inside a Media Access Control (MAC) header.

In an example sequence, based on transmitted AR frames, an AP may signal upcoming uplink SDMA TXOPs by transmitting a Demarcation Indication (DI), for instance, through regular contention. As will be described below, rather than transmit DI frames in separate TXOPs, according to certain aspects, DI frames may also be piggybacked on downlink TXOPs.

Piggybacking Allocation Indication (AI) and Allocation Response (AR) Frames in Transmit Opportunities (TXOPs)

Various types of information may be piggybacked in uplink or downlink TXOPs. For example, in the following description, various types of frames may be piggypbacked in existing TXOPs rather than these frames being sent in separate TXOPs. Examples of such frames include, but are not limited to, allocation indication (AI), allocation response (AR), demarcation indication (DI), block acknowledgement (BA), and block acknowledgement request (BAR) frames. As will be described in greater detail below, a wide variety of different combinations of frames may be piggybacked in uplink transmissions, downlink transmissions, or a combination of piggybacked uplink and downlink transmissions.

Figure 4:
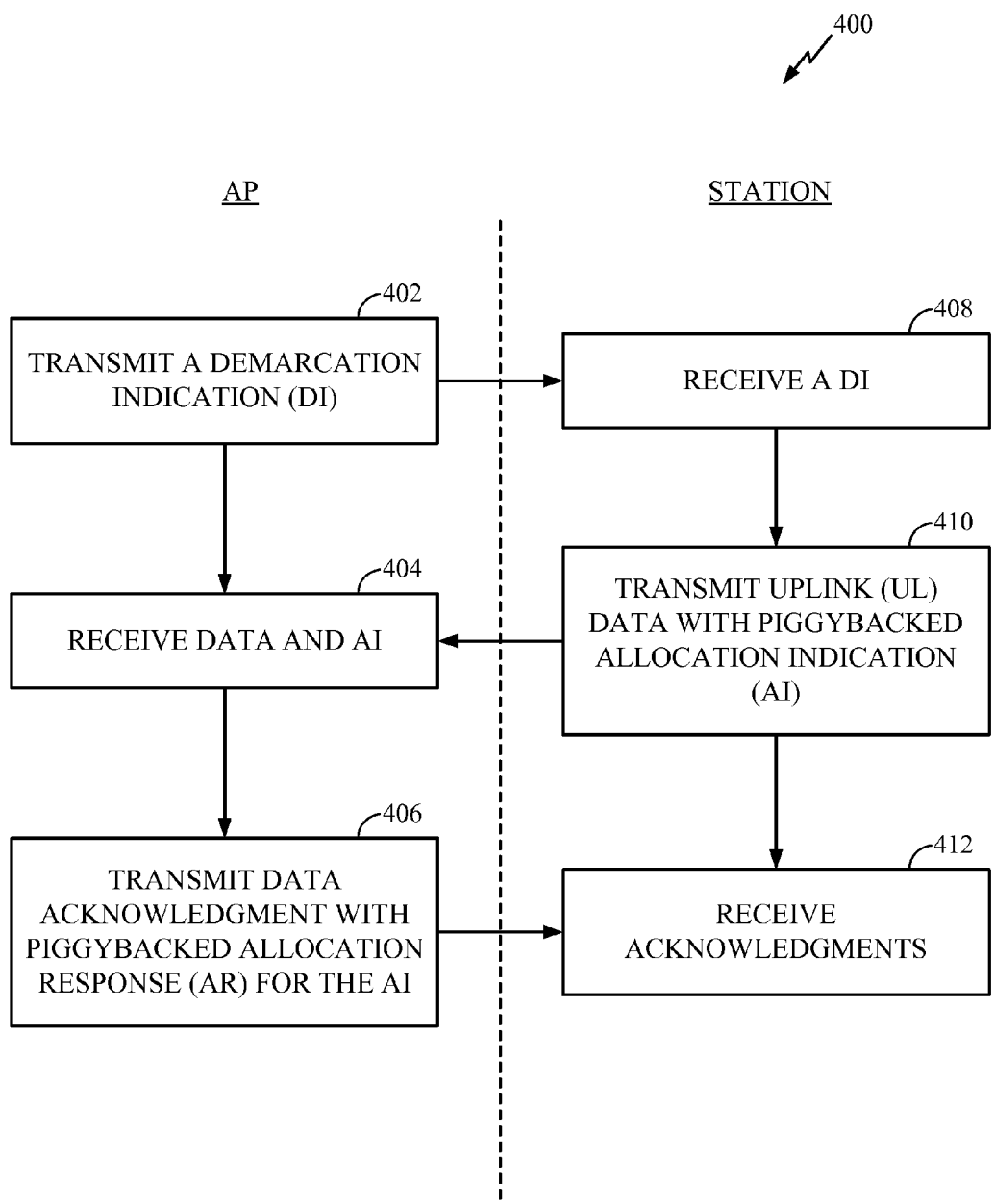
FIG. 4 illustrates example operations for piggybacking Allocation Indication (AI) and Allocation Response (AR) frames, in accordance with certain aspects of the present disclosure.

FIG. 4 illustrates example operations 400 that may be performed by an AP and station utilizing piggybacked information in TXOPs, in accordance with certain aspects of the present disclosure. As illustrated, operations 402-406 may be performed by an AP, while the operations 408-412 may be performed by one or more stations in parallel.

At 402, the AP may transmit a Demarcation Indication (DI) frame to one or more stations. As described above, the DI may indicate the start of an uplink SDMA TXOP. The DI may contain information about the uplink SDMA TXOP such as which stations may be involved in the TXOP, the number of spatial streams each station may use, and the like. The DI may be sent as a separate frame in a dedicated downlink TXOP or piggybacked onto a downlink TXOP.

At 408, a station receives the DI, indicating a start of an uplink TXOP. At 410, the station transmits uplink (UL) data during the uplink TXOP indicated by the DI, with an Allocation Indication (AI) frame piggybacked with the UL data in the TXOP.

At 404, the AP receives the UL data and a request for one or more uplink streams in a second uplink transmit opportunity. For example, a station may send the request as an AI "piggybacked" with UL data send in the first uplink transmit opportunity. In this manner, the station may request (during the first transmit opportunity) resources for transmissions in the second (subsequent) transmit opportunity which may help conserve bandwidth, for example, by avoiding an additional SIFs that might otherwise occur if the request were not piggybacked.

At 406, the AP transmits a data acknowledgement (e.g., a block acknowledgement or BA) with a piggybacked Allocation Response (AR). At 412, the station(s) receive the acknowledgements.

FIG. 5 illustrates an example frame exchange sequence with piggybacked AI and AR frames, in accordance with the operations of FIG. 4. As illustrated, an AP transmits a DI frame 502 (or simply DI) after a backoff period, indicating the start of an upcoming uplink SDMA TXOP. As illustrated, the DI 502 may be used to set the NAV duration sufficient to cover subsequent UL and DL transmissions.

In the illustrated example, the DI 502 may specify that stations 1 through 4 may transmit during the uplink SDMA TXOP. During the uplink SDMA TXOP, the stations 1 through 4 may send uplink A-MPDUs 504 with data frames and piggybacked AI frames. Each AI frame may specify a new request for an uplink TXOP by the corresponding transmitting station.

After the end of the uplink SDMA TXOP, the AP may transmit (using SDMA) an A-MPDU 506 to each station containing a Block Acknowledgement (BA) of the UL data and an AR frame in response to the AI sent with the UL data. The type of BA used to acknowledge data in the uplink direction may be High Throughput (HT)-immediate Block ACK. The ACK policy on uplink frames may serve as an implicit Block ACK Request (Implicit BAR), prompting the AP to respond with a BA even though no explicit BAR is included with the UL data.

FIG. 6 illustrates another example frame exchange sequence. The illustrated exchange may be derived from the frame exchange sequence in FIG. 5. As illustrated in FIG. 6, the AP may transmit downlink data to stations 1 through 4 by means of a downlink SDMA transmission. Downlink A-MPDUs 610 may aggregate a Block ACK request (BAR) along with downlink (DL) data to each station. The ACK policy on the Data MPDUs may be set to Block ACK, and the ACK policy on the BAR frame may be set to No ACK. The type of Block ACK used in the downlink direction may be High Throughput (HT)-delayed Block ACK, indicating that a BA may be transmitted after some delay.

Thus, UL A-MPDUs 604 transmitted by the stations may contain BAs as requested by the AP in the previous downlink SDMA transmission. The ACK policy on the uplink data transmissions may be Implicit BAR, indicating that the AP may transmit BAs piggybacked with ARs in downlink transmission 606, following a Short Inter-frame Space (SIFS) after the uplink transmission. The type of Block ACK used in the uplink direction may be HT-immediate Block ACK, indicating the AP may respond with a BA after a SIFS.

FIG. 7 illustrates another example bidirectional frame exchange sequence. The sequence in FIG. 7 may be created by moving the downlink data transmissions (shown in FIG. 6) to the stations in A-MPDUs 708 containing the downlink BA and AR response to after the uplink A-MPDUs 712. As illustrated, the downlink A-MPDUs 708 may also include BARs. The DL A-MPDUs 708 may follow UL A-MPDUs 712 from the stations that contain BAs, UL data, and AIs. In this example exchange, the BA inside the UL A-MPDUs 712 may acknowledge prior downlink data transmissions (not shown in FIG. 7).

FIG. 8 illustrates another example bidirectional frame exchange sequence. As illustrated, the sequence in FIG. 8 may begin with a DI 802, signaling a UL TXOP. The DI 802 may be used to set the Network Allocation Vector (NAV) protection time for subsequent UL and DL transmissions. During the UL TXOP, stations may send UL transmissions 804 containing UL data with piggybacked AIs. The UL transmissions 804 may be followed by DL transmissions 816 containing BAs, DL data to the stations, and ARs. The UL transmissions 804 may be followed by separate UL BAs 834 sent by the stations, acknowledging the DL data sent in the DL transmissions 816 (e.g., with an implicit BAR).

Piggybacking Demarcation Indication (DI) Frames

As noted above, according to certain aspects of the present disclosure, rather than sending a DI as a separate group addressed frame (e.g., addressing multiple stations), a DI may be aggregated into a downlink A-MPDU and, thus, transmitted to each addressed station individually. While such an aggregated DI will reach only those stations addressed, aggregating the DI onto the downlink transmission may eliminate a separate transmission for an individual DI transmission. This limitation may be acceptable because a downlink TXOP followed by an uplink TXOP from the same set of stations may be a natural way to operate a protocol when all active stations are involved in a bi-directional data exchange. While a piggybacked DI may increase the length of a DL transmission, provided the TXOP is time bounded relative to clock drift, uplink transmissions may still be correctly aligned.

As noted above, aggregating the DI onto a downlink transmissions with data (e.g., with an MPDU) is only one example of piggybacking by an AP. Other types of frames that may be piggybacked include BAs, BARs, and, as will be described below, Reverse Direction Grants (RDGs).

Figure 9:
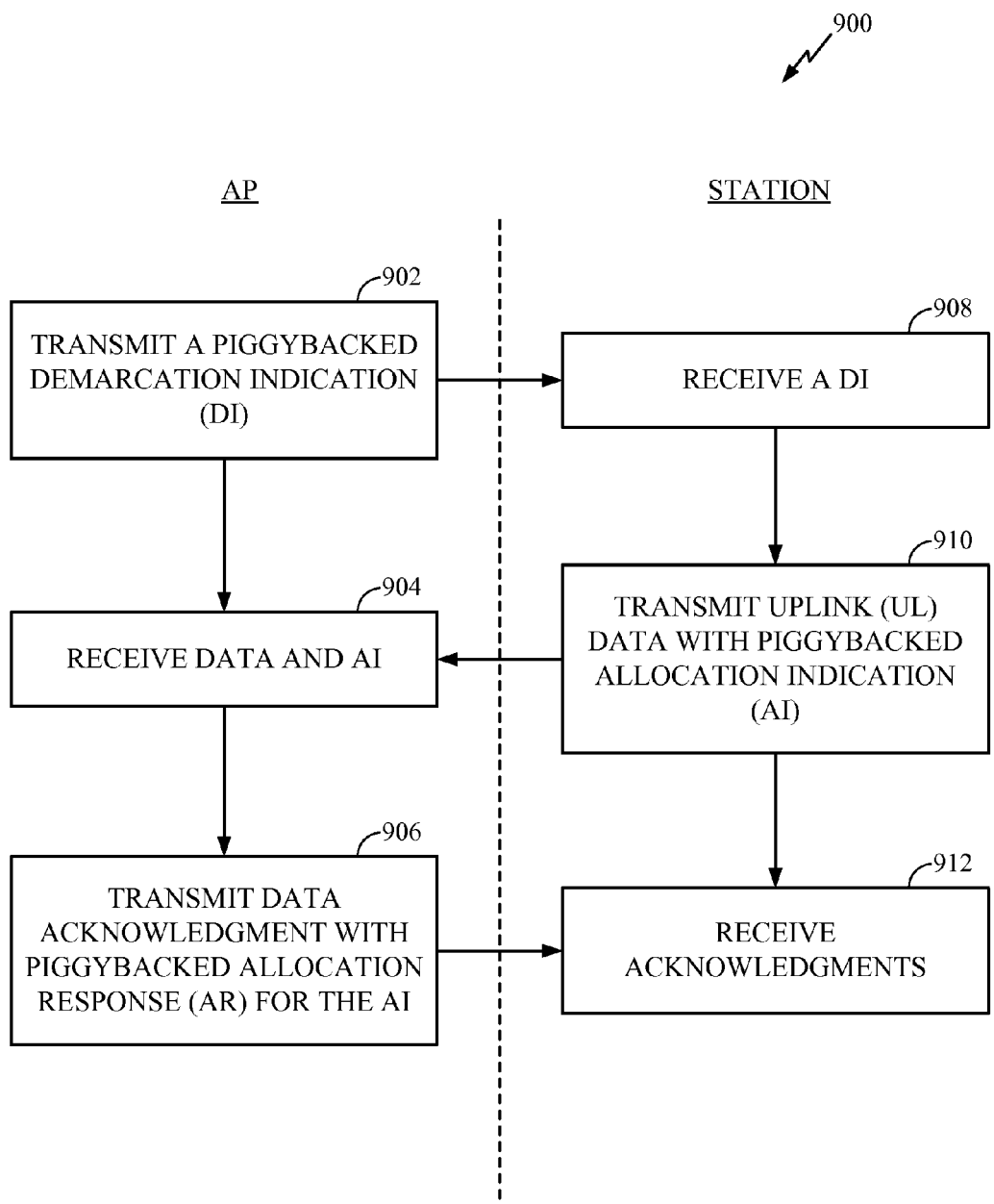
FIG. 9 illustrates example operations for piggybacking a Demarcation Indication (DI) frame, in accordance with certain aspects of the present disclosure.

FIG. 9 illustrates example operations 900 utilizing a piggybacked DI frame. Operations 902-906 may be performed by an AP, while operations 908-912 may be performed by one or more stations in parallel.

At 902, a piggybacked Demarcation Indication (DI) may be transmitted to one or more stations. The DI may be combined (e.g. piggybacked), for example, with a Block ACK Request (BAR) or downlink data. As described earlier, the DI may indicate the start of an uplink SDMA TXOP and contain information about the SDMA TXOP.

At 908, a station may receive the piggybacked DI, indicating the start of an uplink SDMA TXOP. At 910, the station may transmit UL data during the UL SDMA TXOP, along with a piggybacked AI frame (e.g., to request an additional UL TXOP). At 904, the AP receives the UL data and AI frame. At 906, the AP transmits an acknowledgement of the UL data and an AR in response to the AI, received by the station, at 912.

FIG. 10 illustrates an example frame exchange sequence with a piggybacked DI, in accordance with the operations of FIG. 9. The example frame exchange sequence may begin with DL A-MPDUs 1014 containing DIs piggybacked with BARs. After a SIFS period, the subsequent uplink transmissions 1012 may contain UL Block ACKs, an AI for the next TXOP, and the UL data.

After the uplink SDMA TXOP, the AP may respond with SDMA transmissions 1016 containing, for each station, a BA, an AR response to the AI, and DL data. The DL data transmissions may specify the Block ACK policy so as to not elicit an immediate response from the stations. Thus, the BA may be requested through a subsequent DI+BAR transmission (similar to transmissions 1014) by the AP, and this cycle may be repeated. HT-immediate BA may now be used in both directions. The Block ACK acknowledgement policy may be used on downlink data transmissions to avoid a SIFS response after the downlink SDMA transmission.

Rather than transmit DL A-MPDUs 1014 with separate piggybacked DI and BAR frames for each station, as shown in FIG. 10, an AP may transmit a single piggybacked DI frame. For example, as illustrated in FIG. 11, an AP may send a single DL transmission 1118 containing a group addressed DI and BAR frames. In this case, the DL transmission 1118 containing the DI does not need to be transmitted as an SDMA transmission.

Figure 12:
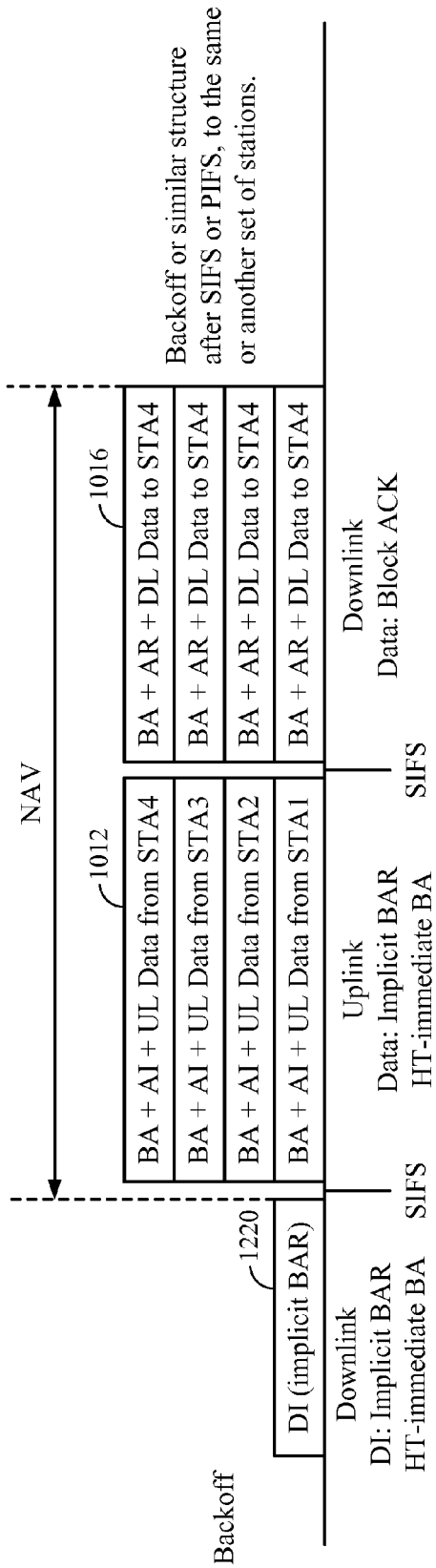

As illustrated in FIG. 12, a DI may also be sent as a DL transmission 1220 with an added implicit BAR property for the stations that are granted an UL TXOP and, for example, which have an HT-immediate Block ACK agreement with the AP. The implicit BAR property implies that the receiving stations will send the BA they would have transmitted when the latest downlink Data MPDU had the implicit BAR property.

Figure 13:
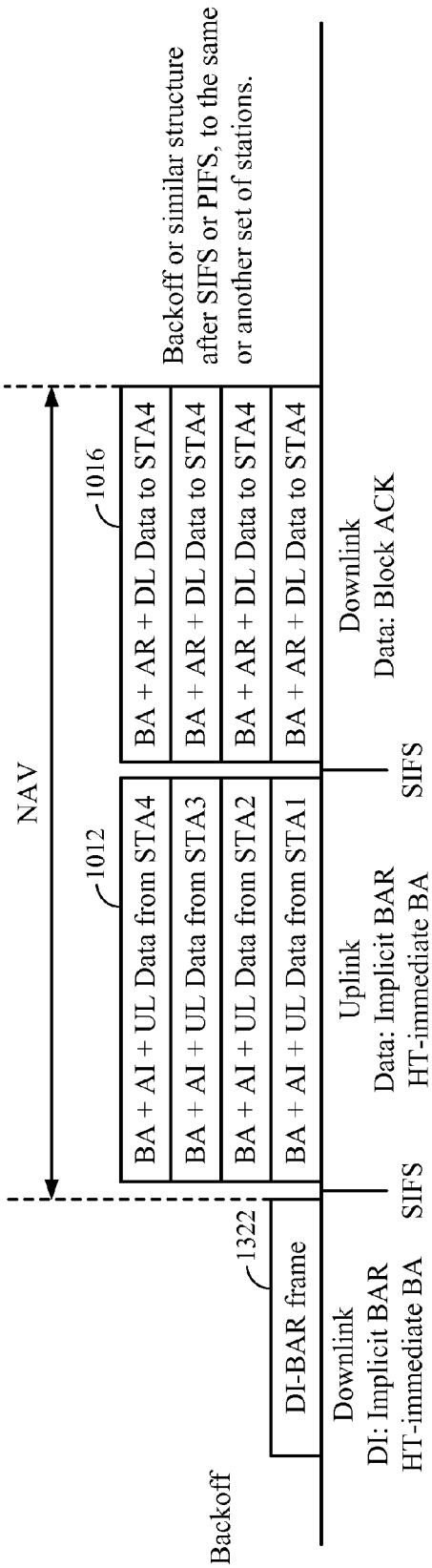

As illustrated in FIG. 13, a bidirectional frame exchange sequence may also be formed by including BAR information into a DI frame format. The combined DI and BAR frame is indicated as DI-BAR frame 1322. In addition to the information from a DI frame, the DI-BAR frame 1322 format may contain any or all of the information contained in a BAR frame, for some number of destination STAs (e.g., for a subset of stations indicated in the DI part).

Figure 14:
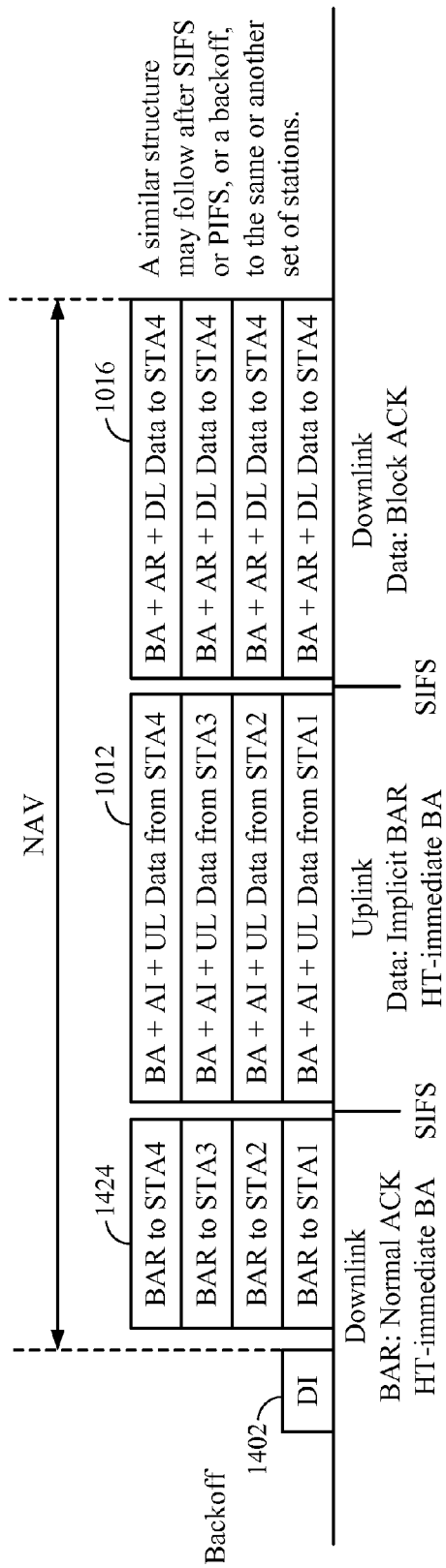

As an alternative, as illustrated in FIG. 14, the DI may be included in a separate frame 1402 and separate BARs for each station may be included in SDMA DL transmissions 1424. The DI frame 1402 may contain an offset after which the uplink SDMA transmission may start. The downlink BAR frames 1424 may be transmitted before the uplink SDMA transmissions start. Because the BAR frames 1424 may be relatively short frames, alignment of the timing of the uplink SDMA sequence may not become an issue in this example.

Figure 15:
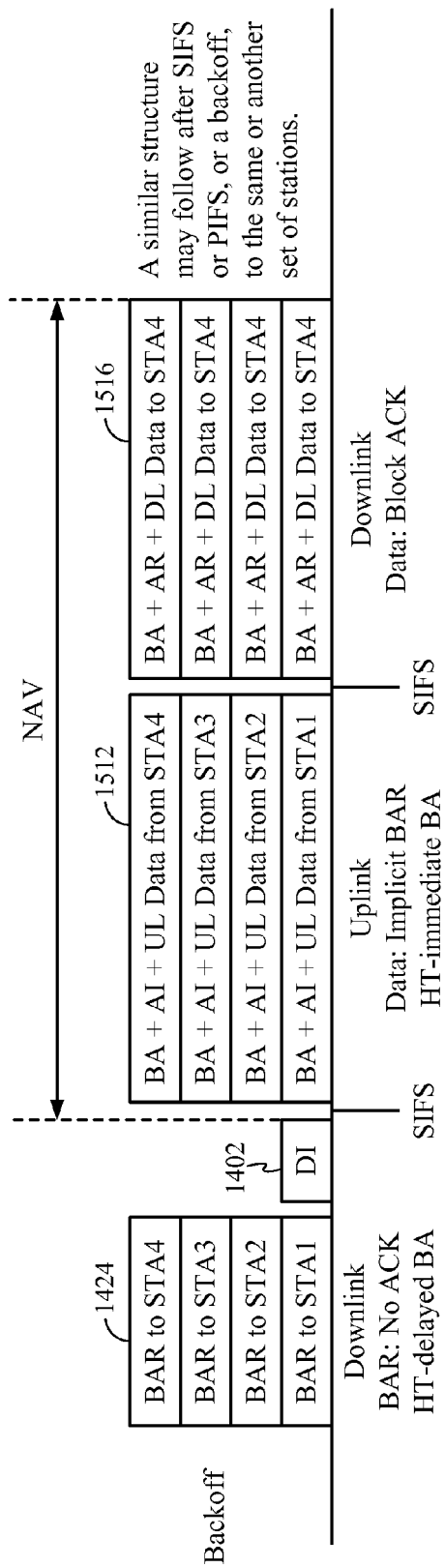

As illustrated in FIG. 15, the DI frame 1402 and SDMA BAR frames 1424 may be swapped in order. The ACK policy on the downlink BAR frames 1424 may change to be No ACK in the sequence of FIG. 15 and the BA type in the downlink direction may change from HT-immediate BA to HT-delayed BA.

FIG. 16 illustrates another example frame exchange sequence. The illustrated sequence may exploit the idea that a downlink data transmission may be short enough for an uplink SDMA TXOP to start correctly (i.e. with small enough clock drift at each individual station). As a result, DI, AI, and AR may all be piggybacked in this example, in DL SDMA transmissions 1626, UL SDMA transmissions 1612, and DL SDMA BA transmissions 1606, respectively. As illustrated, the UL SDMA transmissions 1612 from the stations may include UL data. NAV protection may not be necessary in this case because there are only SDMA transmissions.

According to certain aspects, the DI frames is SDMA DL transmissions 1626 may be replaced with Reverse Direction Grants (RDGs) in DL SDMA transmissions 1728, as shown in FIG. 17. The RDGs may be indicated inside the MAC headers of downlink SDMA frames 1728. The RDGs may be defined to indicate that the receiving stations may respond to the AP SIFS after the end of the longest downlink transmission, for example, using the same spatial streams the AP uses to transmit to the AP. Thus, the RDG may, in effect, serve as an implicit DI.

FIGS. 18 and 19 illustrate other example frame exchange sequences. As illustrated in FIG. 18, downlink BA and AR frames may be included, along with a DI and DL Data in initial DL data transmissions 1830 (the BA and AR frames may be transmitted in response to earlier received UL data and AI frames, respectively). The DL data MPDUs may indicate the Implicit BAR policy, under an HT-immediate BA policy. As illustrated, subsequent UL SDMA transmissions 1832 may contain BAs, UL data, AIs for subsequent TXOPs, and BARs. The UL data MPDUs may indicate the Block ACK policy under an HT-delayed BA policy. The AI MPDUs may indicate a No ACK policy. The BAR MPDUs may indicate a No ACK policy.

FIG. 19 illustrates an alternative frame exchange sequence, with UL MPDUs 1904 containing UL data, AIs, and BAs, followed by downlink data MPDUs 1936 with BAs and ARs. The downlink Data frames may indicate an Implicit BAR policy. As illustrated, uplink BA response transmissions 1938 may occur during an uplink SDMA TXOP started by an implicit DI. For example, the downlink Data MPDUs 1936 may indicate an Implicit BAR ACK policy, causing the receiving stations to respond after a SIFS period following the longest packet with a BA MPDUs 1938. The stations may use the same spatial streams for the uplink transmission as were used on the prior downlink transmission to the station, for the implicit DI that causes uplink transmissions 1938 to occur.

Figure 20:
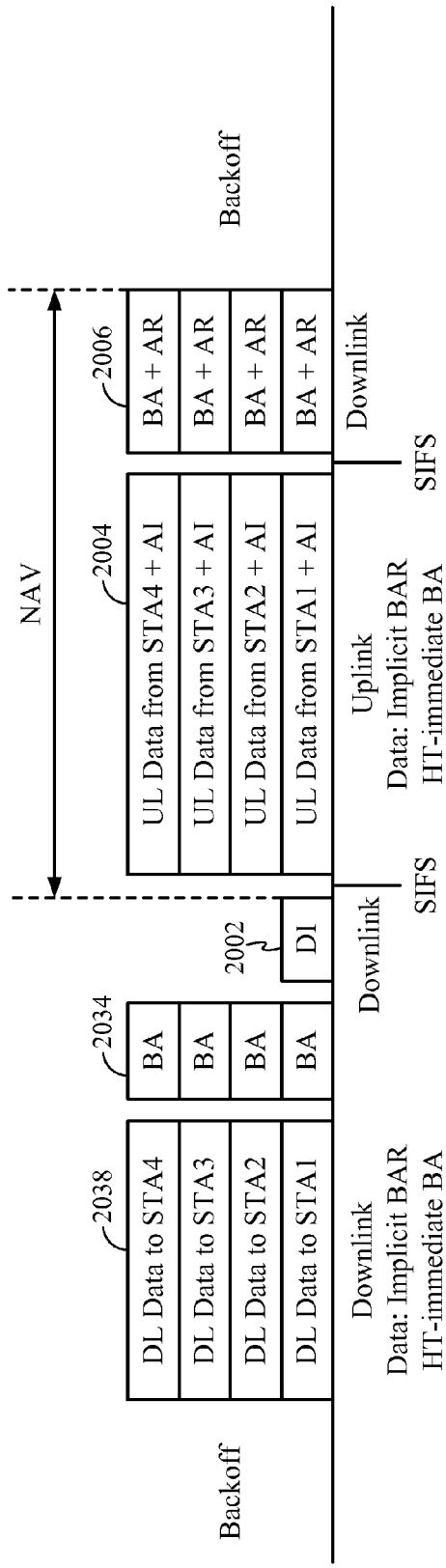

FIG. 20 illustrates an example frame exchange sequence, again utilizing an implicit DI. As illustrated, downlink Data MPDUs 2038 indicate the Implicit BAR ACK policy, causing the receiving stations to turn around SIFS after the longest packet with BA MPDUs 2034, as a result of the implicit DI defined on the downlink packets indicating a SIFS response. As illustrated, an explicit DI frame 2002 may signal subsequent TXOPs for UL SDMA transmissions 2004 containing aggregated UL data and AI. The UL data and AIs may be acknowledged by BAs and ARs, respectively, contained in DL SDMA transmissions 2006.

Figure 21:
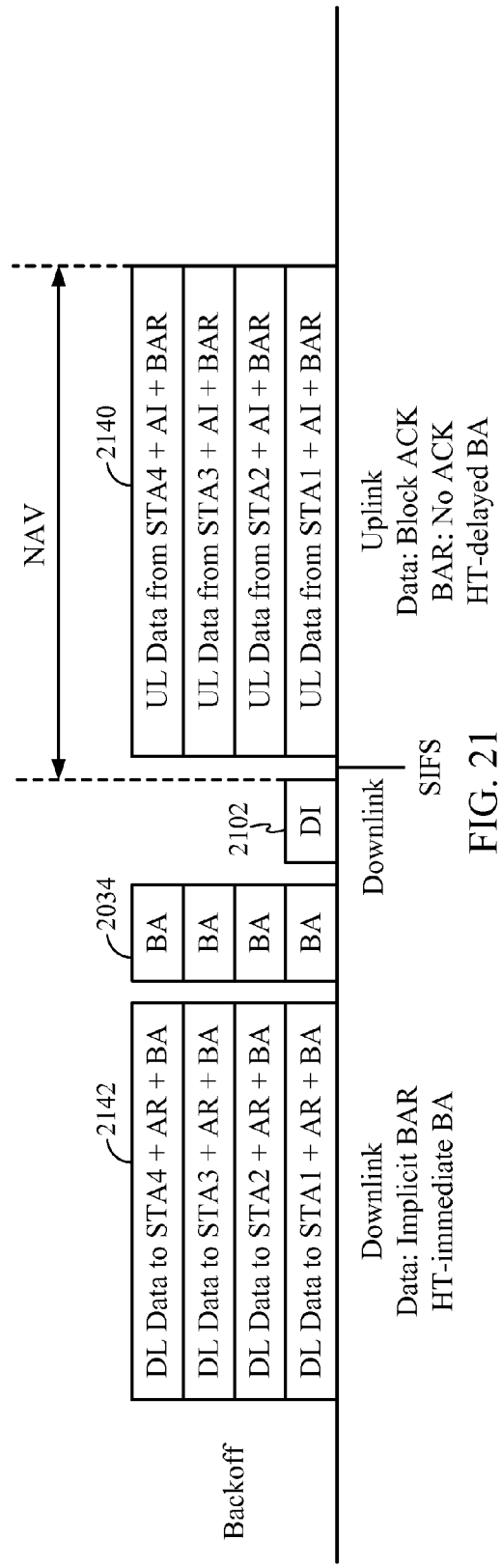

Rather than utilize separate DL transmissions 2006 containing BAs and ARs, the UL data and AIs may be acknowledged in BAs and ARs included in DL data transmissions 2142, as illustrated in FIG. 21. Further, UL data transmissions 2140 may include UL data, AIs, and BARs.

Adding Information to a MAC Header

As described earlier, piggybacked information (e.g., AI and AR information) may be included inside a Media Access Control (MAC) header. To accomplish this, fields may be added to the MAC header of Control, Management or Data frames to carry corresponding information, such as the requested or granted number of spatial streams. Thus, these fields may be referred to as Requested Number of Spatial Streams (RSS) field for AI and Granted Number of Spatial Streams GSS field (GSS) for AR. The same field may be reused to serve as RSS field on uplink transmissions and GSS field on downlink transmissions. As an example, when set to a value of 0, an RSS field may indicate a request to terminate the generation of uplink TXOPs for that station. Similarly, when set to a value of 0, a GSS field may indicate termination of the generation of uplink TXOPs for that station.

In some cases, adding fields inside the MAC header may not protect against a so-called "spoofing" attack (where an attacker observes field values and replicates them in an attempt to generate a transmissions that appears valid). To this end, according to certain aspects, an RSS and/or GSS field may be included in a Message Integrity Check (MIC) field. A Packet Identification Number (PIN) may also be present in this case, which may get updated for each frame. Another option which may include these facilities by default is including the information inside a Data frame, for instance, by encapsulating the information behind a Logical Link Control (LLC) header. The LLC header may indicate that the frame is an 802.11 signaling frame, for instance by using Sub Network Access Protocol (SNAP) after the LLC and specifying an Ethertype. Another option may be to put the information inside the frame body of a management frame and use 802.11w to encrypt the management frame.

It may be noted that when many MPDUs are aggregated, aggregating an AI or AR frame may be more efficient than including an RSS/GSS field in every MAC header.

Another option for the uplink AI-type signaling is adding a "More TXOP" field inside the MAC header. The More TXOP field may be, for example, a single bit in size and indicate whether another TXOP is requested after the current TXOP, with the same properties as the current TXOP. In this case, changing the number of spatial streams may be achieved by sending an AI frame.

New TXOPs may also be assigned automatically once requested, and terminated when one or more unused TXOPs occur. In this case no explicit uplink signaling may take place once an uplink SDMA TXOP is obtained.

According to certain aspects, an AR may be transmitted by an AP in an unsolicited manner to update the number of spatial streams when resources become available. A receiving station may send an ACK in response to receiving an unsolicited AR.

Formatting of AI, AR and DI Frames

According to certain aspects, an AI/AR/DI frame may be formatted as an Action frame. In such cases, there may be a choice between Action and Action No ACK, depending on whether the PHY Protocol Data Unit (PPDU) containing the frame receives an immediate return frame. When formatted as a Control frame, the ACK policy may either be fixed by definition (i.e., immediate response for AI, no response for AR, similar to RTS and CTS, respectively), or an ACK policy field is included to control the ACK policy depending on the PPDU in which the frame gets aggregated (similar to the ACK policy field inside a BAR frame). Example formatting for AI, AR and DI frames is described below.

In FIGS. 22-26, various example fields for various types of frames are shown to illustrate example frame formats that may be used. According to certain aspects, some of the example fields illustrated in these figures may be optional, required, or not used at all. Further, according to certain aspects, various field not shown in these figures may be used as an alternative, or in addition to, the fields shown.

FIG. 22 illustrates an example formatting for an AI frame. As illustrated, the AI frame may be formatted as an unencrypted Action (No ACK) Frame 2202 or as an encrypted Action (No ACK) frame 2204.

As illustrated, an AI action frame may contain a Frame Control (fc) field, Duration (dur) field, Destination Address (da) field, Source Address (sa) field, Basic Service Set Identifier (BSSID) field, Sequence Control (sc) field, category field, action field, Requested number of Spatial Streams (rss) field, and a Frame Check Sequence (fcs) field, for 31 octets altogether. The da field may contain the MAC address of the AP (typically referred to as the Basic Service Set Identifier or BSSID), the sa field may contain the station's own MAC address. The BSSID may contain the MAC address of the AP; the sc field may contain a frame sequence number. The category field may contain the category of the action frame body (for example Very High Throughput—VHT), the action field may contain the name of the action frame body (AI in this case). The rss field may contain a requested number of spatial streams. The fcs field may contain a Cyclic Redundancy Check (CRC). The encrypted version of the AI action frame may in addition contain a counter mode (CTR) with cipher-block chaining message authentication code (CBC-MAC) Protocol header (ccmp hdr) and a Message Integrity Code (mic), which allow for encryption and checking the integrity of the frame. Encryption of a Management type frame assumes that 802.11w is supported.

When transmitted as an Action No ACK frame, the AI may not cause an immediate response.

As an example illustration of potential performance gains, assuming a 200 Mbps PHY rate, the A-MPDU transmission time may increase by approximately 1.24 microseconds (us) due to the addition of an AI frame for the non-encrypted AI and may increase by approximately 1.88 us due to the addition of an encrypted AI frame. Relative to an approximate 4 microsecond (ms) TXOP size, this increase may be negligible (0.03% and 0.05%, respectively).

As illustrated in FIG. 23, AR frames may also be formatted as an unencrypted Action (No ACK) Frame 2302 or as an encrypted Action (No ACK) frame 2304. As illustrated, the frames 2302 and 2304 may include the same types of fields as the AI frames 2202 and 2204 show in FIG. 22.

Figure 24:
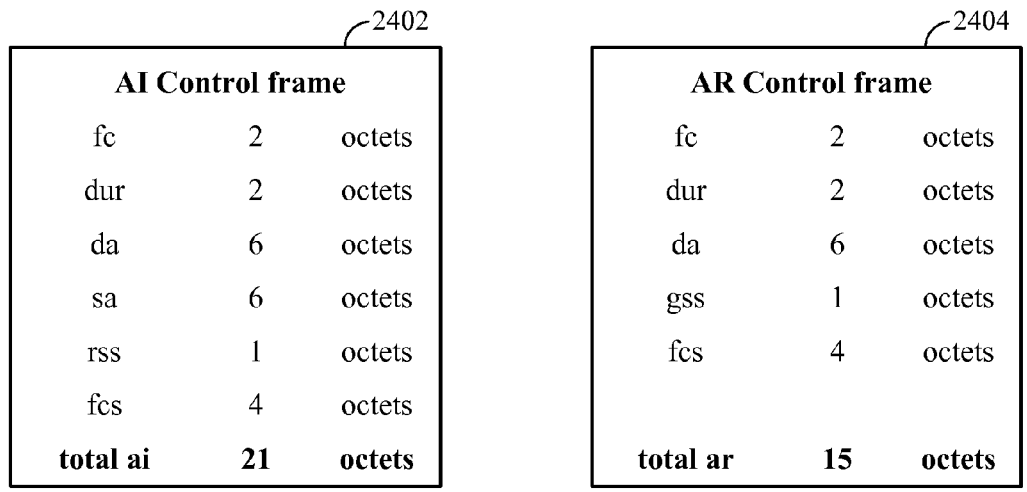

FIG. 24 illustrates an example formatting for AI and AR frames. In this example, the AI and AR frames may be formatted as Control frames 2402 and 2404, respectively. An AI frame may contain a Frame Control (fc) field, Duration (dur) field, Destination Address (da) field, Source Address (sa) field, Requested number of Spatial Streams (rss) field, and a Frame Check Sequence (fcs) field, for 21 octets altogether. The da field may contain the MAC address of the AP (typically referred to as the Basic Service Set Identifier or BSSID), the sa field may contain the station's own MAC address.

An AR frame may contain an fc field, dur field, da field, granted number of Spatial Streams (gss) field, and an fcs field, for 15 octets altogether. The da field may contain the address of the station.

An ACK field may have to be added when an immediate response needs to be controlled depending on the PPDU properties. Using 36 Mbps OFDM rate, the transmit durations may be approximate 28 us for the AI Control frame and approximately 24 us for the AR Control frame. Control frames can be aggregated as part of an A-MPDU.

As described above, AI and AR control frames may be aggregated as part of an A-MPDU, but their response policy is fixed by definition. A suitable response policy may be that a PPDU containing an AR is transmitted SIFS after receiving a PPDU containing an AI, and that an AR MPDU does not elicit an immediate response.

Figure 25:
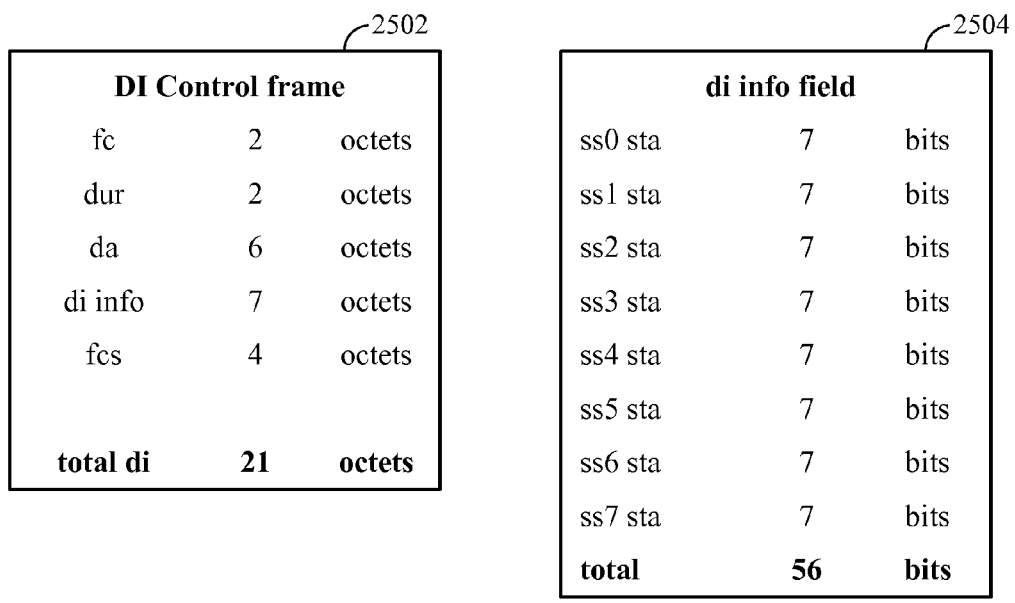

FIG. 25 illustrates example for formatting a DI frame as a Control frame 2502. A DI Control frame may contain an fc field, a dur field, a da field, a di info field, and an fcs field, for 21 octets in total. As illustrated, the di info field 2504 may contain for each spatial stream (ss0-ss7) the station which is assigned to transmit on it. The station identifier is assumed to be 7 bits in size, for 128 stations in total. The di info field may become 56 bits or 7 octets in length in this way. The da field may contain a broadcast or multicast address, or a unicast station address when sent to a station individually. The DI control frame transmit duration is 28 us when using 36 Mbps OFDM.

FIG. 26 illustrates an example for formatting a DI frame as an un encrypted Action (No ACK) frame 2602 or an encrypted Action (No Ack) frame 2604. The formatting may be done with and without Counter Mode with Cipher Block Chaining Message Authentication Code Protocol (CCMP) encryption.

Uplink Frame Exchange Sequences for Multiple Stations

While the illustrated example sequences assumed four stations to facilitate understanding, those skilled in the art will appreciate that the techniques presented herein may be applied to systems with a larger number of stations. In such cases, when there are more stations than available TXOPs inside an uplink SDMA TXOP, multiple uplink SDMA TXOPs may be used to address all stations. In such cases, the AP may have several options for the time between the uplink TXOPs in this case: a regular backoff, a reduced backoff, DIFS, PIFS, or SIFS. Each interval may have different fairness properties with respect to other contenders in the network, and different properties with respect to overall efficiency. Between blocks of TXOPs which address all stations currently active in uplink SDMA TXOPs, the AP may allow contention to occur (i.e. insert a backoff), which allows for other uplink transmissions to occur (like for instance out-of-txop AI transmissions, legacy transmissions, or DI transmissions from overlapping networks). This method assumes PIFS time between TXOPs inside a TXOP block which addresses all stations.

According certain embodiments, a first set of uplink TXOPs $T_1$ may provide access for a first set of stations (e.g., STA 1 through 4). The TXOP is followed by a PIFS to allow for one slot of Clear Channel Assessment (CCA). The AP may then send a second DI followed by a set of uplink TXOPs $T_2$ for a second set of stations (e.g., 0 STA 5 through 8). A third DI may follow for TXOPs $T_3$ for a third set of stations (e.g., STA 9 through 11). After the third set of uplink TXOPs $T_3$, the AP may have addressed all STAs which have requested and/or successfully continued uplink TXOPs, and a backoff may follow. During the backoff period at the AP, another station (e.g., STA 12) may send an AI to the AP, requesting for an uplink TXOP. The backoff at the AP may continue and when it expires, the AP may transmit another DI to start a next round of uplink TXOPs. All other uplink transmissions in the first block of uplink TXOPs (for STA 1 through 11) contained a new TXOP request, so that the AP may generate new TXOPs. STA 12 may also receive an uplink TXOP in this iteration.

As noted, many of the example sequences described above rely on ACK policy settings to accomplish desired responses, with example ACK policy settings illustrated in the corresponding Figures. ACK policies may be set according to the following description.

The BA response to an HT-delayed BAR may be transmitted after an unspecified delay, and when the recipient of the BAR next has the opportunity to transmit. This response may be transmitted in a later TXOP owned by the recipient of the BAR or in the current or a later TXOP owned by the sender of the BAR using the reverse direction feature.

The No Ack feature of a BAR and BA frame may be used under an HT-delayed BA agreement.

A BAR or BA frame containing a BAR Ack Policy or BA Ack Policy field set to 1 may indicate that no acknowledgement is expected to these control frames. Otherwise, an ACK MPDU response may be expected after a SIFS.

Setting of the BAR Ack Policy and BA Ack Policy fields may be performed independently for BAR and BA frames associated with the same HT-delayed BA agreement. All four combinations of the values of these fields are valid.

Setting of the BAR Ack Policy and BA Ack Policy fields is dynamic, and may change from PPDU to PPDU.

Figure 4A:
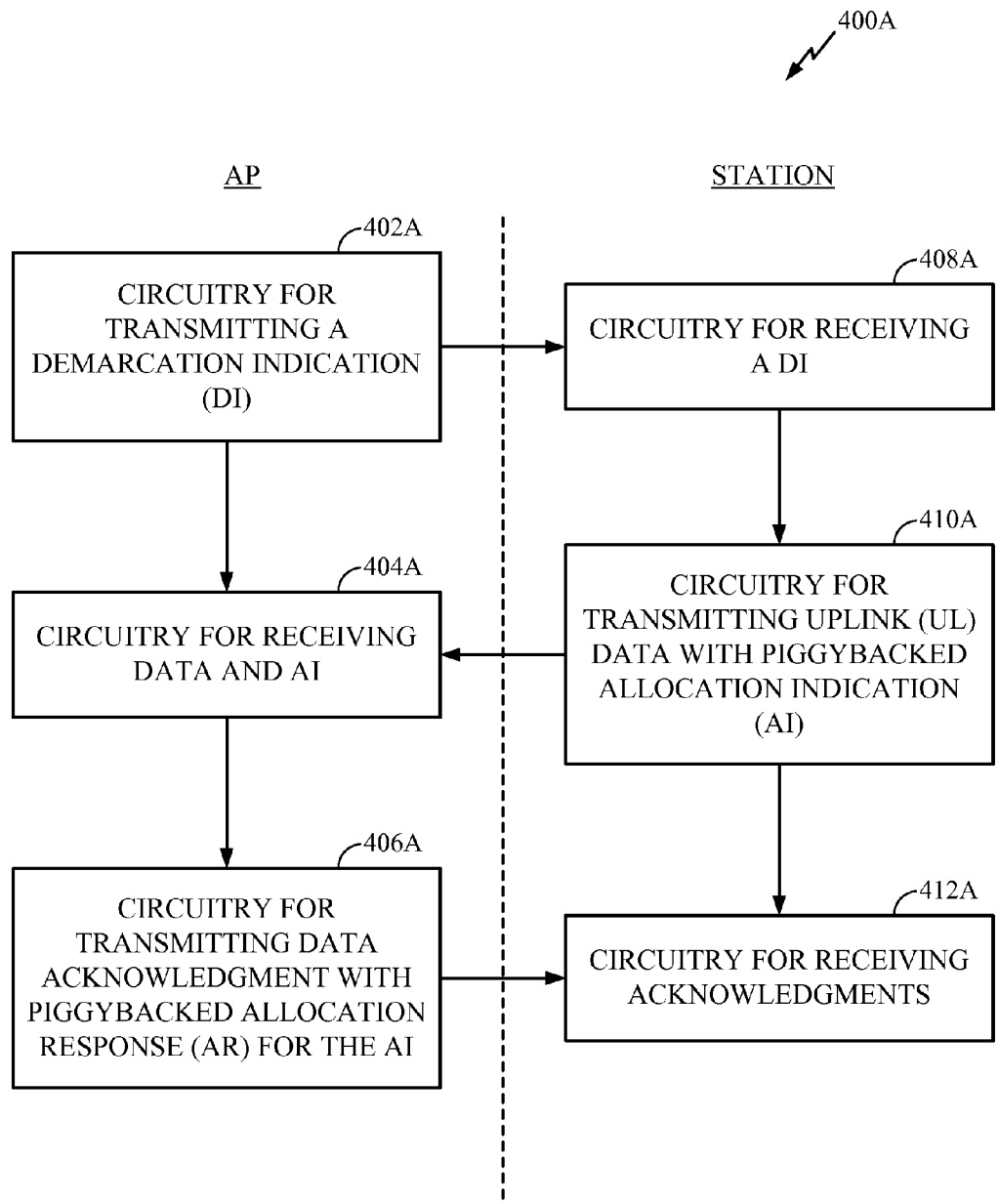
FIG. 4A illustrates example circuitry capable of performing the operations illustrated in FIG. 4.
Figure 9A:
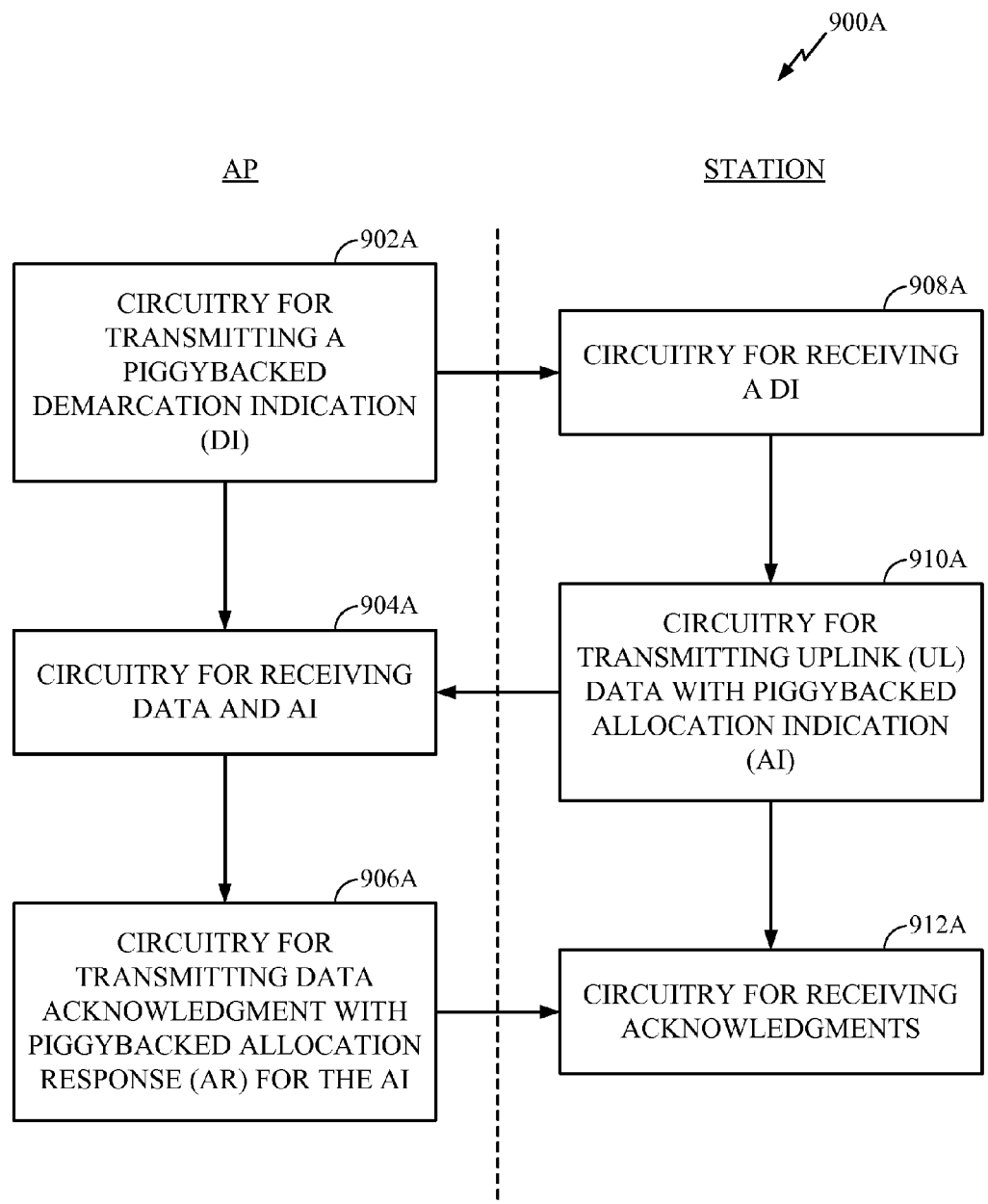
FIG. 9A illustrates example circuitry capable of performing the operations illustrated in FIG. 9.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components and/or circuitry with similar numbering. For example, blocks 402-412 and 902-912 illustrated in FIGS. 4 and 9 correspond to circuit blocks 402A-412A and 902A-912A illustrated in FIGS. 4A and 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure, and recited in the claims below, may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims

The invention claimed is:

1. A method comprising:
transmitting a downlink transmission to a plurality of wireless nodes, the downlink transmission comprising a demarcation indication of a start of a first uplink transmit opportunity, wherein the demarcation indication is piggybacked with a particular downlink frame in the downlink transmission;
receiving, responsive to the downlink transmission and during the first uplink transmit opportunity, multiple uplink transmissions concurrently from the plurality of wireless nodes, wherein each of the multiple uplink transmissions includes a media access control (MAC) header that includes a request for a second uplink transmission opportunity, wherein each of the multiple uplink transmissions comprises uplink data piggybacked with the request, and wherein a network allocation vector (NAV) associated with the multiple uplink transmissions starts upon completion of transmission of the demarcation indication; and
transmitting, responsive to the multiple uplink transmissions, an acknowledgement of the uplink data to each of the plurality of wireless nodes, wherein an allocation response is piggybacked with the acknowledgement.

2. The method of claim 1, further comprising receiving the multiple uplink transmissions transmitted by the plurality of wireless nodes via a spatial division multiple access (SDMA) scheme.

3. The method of claim 1, further comprising transmitting the downlink transmission via a spatial division multiple access (SDMA) scheme.

4. The method of claim 1, wherein the demarcation indication is addressed to a group of wireless nodes of the plurality of wireless nodes.

5. The method of claim 1, wherein the demarcation indication is addressed to a first wireless node of the plurality of wireless nodes, wherein the downlink transmission further comprises a second demarcation indication of the start of the first uplink transmit opportunity, wherein the second demarcation indication is addressed to a second wireless node of the plurality of wireless nodes, and wherein the first wireless node is different from the second wireless node.

6. The method of claim 1, wherein the downlink transmission further comprises downlink data addressed to at least one wireless node of the plurality of wireless nodes.

7. The method of claim 1, wherein the downlink transmission further comprises a block acknowledgement request.

8. The method of claim 1, wherein at least one uplink transmission of the multiple uplink transmissions includes an acknowledgement of previously transmitted downlink data.

9. The method of claim 1, wherein at least one uplink transmission of the multiple uplink transmissions includes a block acknowledgement request.

10. The method of claim 1, wherein the downlink transmission further comprises a block acknowledgement, a block acknowledgement request, downlink data, or a combination thereof.

11. A method comprising:
receiving, from an access point, a downlink transmission comprising a demarcation indication of a start of a first uplink transmit opportunity, wherein the demarcation indication is piggybacked with a particular downlink frame in the downlink transmission;
transmitting an uplink transmission during the first uplink transmit opportunity, wherein the uplink transmission is sent to the access point after the downlink transmission is received, wherein the uplink transmission is transmitted from a first wireless node concurrently with one or more additional uplink transmissions sent from one or more additional wireless nodes, wherein the uplink transmission and each of the one or more uplink transmissions includes a media access control (MAC) header that includes a request for a second uplink transmit opportunity, wherein the uplink transmission and each of the one or more uplink transmissions comprise uplink data piggybacked with the request, and wherein a network allocation vector (NAV) associated with the uplink transmission and the one or more additional uplink transmissions starts upon completion of transmission of the demarcation indication; and receiving, responsive to the uplink transmission, an acknowledgement of the uplink data of the uplink transmission, wherein an allocation response is piggybacked with the acknowledgement.

12. The method of claim 11, further comprising receiving the downlink transmission via a spatial division multiple access (SDMA) scheme.

13. The method of claim 11, wherein the uplink transmission is transmitted concurrently with the one or more additional uplink transmissions via a spatial division multiple access (SDMA) scheme.

14. The method of claim 11, further comprising transmitting at least one acknowledgement of previously received downlink data in the uplink transmission.

15. The method of claim 11, further comprising transmitting at least one block acknowledgement request in the uplink transmission.

16. The method of claim 11, wherein the downlink transmission further comprises a block acknowledgement, a block acknowledgement request, downlink data, or a combination thereof.

17. An apparatus comprising:
a transmitter configured to transmit, to a plurality of wireless nodes, a downlink transmission comprising a demarcation indication of a start of a first uplink transmit opportunity, wherein the demarcation indication is piggybacked with a particular downlink frame in the downlink transmission; and
a receiver configured to receive, responsive to the downlink transmission and during the first uplink transmit opportunity, multiple uplink transmissions concurrently from the plurality of wireless nodes, wherein each of the multiple uplink transmissions includes a media access control (MAC) header that includes a request for a second uplink transmit opportunity, wherein each of the multiple uplink transmissions comprises uplink data piggybacked with the request, wherein a network allocation vector (NAV) associated with the multiple uplink transmissions starts upon completion of transmission of the demarcation indication, wherein, responsive to the multiple uplink transmissions, the transmitter is configured to transmit an acknowledgement of the uplink data to the plurality of wireless nodes, and wherein an allocation response is piggybacked with the acknowledgement.

18. The apparatus of claim 17, wherein the downlink transmission indicates that the first uplink transmit opportunity is granted to at least a first wireless node of the plurality of wireless nodes, wherein the receiver is further configured to receive simultaneous transmissions of first data and second data, wherein the first data is sent from the first wireless node via a first uplink stream during the first uplink transmit opportunity, wherein the second data is sent from the first wireless node via a second uplink stream during the first uplink transmit opportunity, and wherein the first data is different from the second data.

19. The apparatus of claim 17, wherein the transmitter is further configured to transmit, to the plurality of wireless nodes, the particular downlink frame piggybacked with the demarcation indication via a spatial division multiple access (SDMA) scheme, and wherein the demarcation indication is addressed to a group of wireless nodes of the plurality of wireless nodes.

20. The apparatus of claim 17, wherein the demarcation indication is addressed to a first wireless node of the plurality of wireless nodes, wherein the downlink transmission further comprises a second demarcation indication of the start of the first uplink transmit opportunity, wherein the second demarcation indication is addressed to a second wireless node of the plurality of wireless nodes, and wherein the first wireless node is different from the second wireless node.

21. The apparatus of claim 17, wherein the downlink transmission further comprises downlink data addressed to at least one wireless node of the plurality of wireless nodes.

22. The apparatus of claim 17, wherein the downlink transmission further comprises at least one block acknowledgement request.

23. The apparatus of claim 17, wherein at least one uplink transmission of the multiple uplink transmissions includes an acknowledgement of previously transmitted downlink data, a block acknowledgement request, or a combination thereof.

24. The apparatus of claim 17, wherein the downlink transmission further comprises a block acknowledgement, a block acknowledgement request, downlink data, or a combination thereof.

25. An apparatus comprising: a receiver configured to receive, from an access point, a downlink transmission comprising a demarcation indication of a start of a first uplink transmit opportunity, wherein the demarcation indication is piggybacked with a particular downlink frame in the downlink transmission; and
a transmitter configured to transmit an uplink transmission during the first uplink transmit opportunity, wherein the uplink transmission is sent to the access point after the downlink transmission is received, wherein the uplink transmission is transmitted concurrently with one or more additional uplink transmissions sent from one or more wireless nodes, wherein the uplink transmission and each of the one or more uplink transmissions includes a media access control (MAC) header that includes a request for a second uplink transmit opportunity, wherein each of the uplink transmissions comprises uplink data piggybacked with the request, wherein a network allocation vector (NAV) associated with the uplink transmission and the one or more additional uplink transmissions starts upon completion of transmission of the demarcation indication, and wherein, responsive to the uplink transmission, the receiver is configured to receive an acknowledgement of the uplink data of the uplink transmission, wherein an allocation response is piggybacked with the acknowledgement.

26. The apparatus of claim 25, wherein the transmitter is further configured to transmit the uplink transmission simultaneously with the one or more additional uplink transmissions via a spatial division multiple access (SDMA) scheme.

27. The apparatus of claim 25, wherein the uplink transmission further comprises at least one acknowledgement of previously received downlink data, at least one block acknowledgement request, or a combination thereof.

28. The apparatus of claim 25, wherein the downlink transmission further comprises a block acknowledgement, a block acknowledgement request, downlink data, or a combination thereof.

29. An apparatus comprising:
means for transmitting, to a plurality of wireless nodes, a downlink transmission comprising a demarcation indication of a start of a first uplink transmit opportunity, wherein the demarcation indication is piggybacked with a particular downlink frame in the downlink transmission; and means for receiving, responsive to the downlink transmission and during the first uplink transmit opportunity, multiple uplink transmissions concurrently from the plurality of wireless nodes, wherein each of the multiple uplink transmissions includes a media access control (MAC) header that includes a request for a second uplink transmission, wherein each of the multiple uplink transmissions comprises uplink data piggybacked with the request, wherein a network allocation vector (NAV) associated with the multiple uplink transmissions starts upon completion of transmission of the demarcation indication, and wherein, responsive to the multiple uplink transmissions, the means for transmitting is configured to transmit an acknowledgements of the uplink data to each of the multiple uplink transmissions, wherein an allocation response is piggybacked with the acknowledgement.

30. The apparatus of claim 29, wherein the at least one uplink transmission further comprises an aggregated media access control protocol data unit (A-MPDU) that includes the uplink data and the request.

31. The apparatus of claim 29, wherein the demarcation indication is addressed to a first wireless node of the plurality of wireless nodes, wherein the downlink transmission further comprises a second demarcation indication of the start of the first uplink transmit opportunity, wherein the second demarcation indication is addressed to a second wireless node of the plurality of wireless nodes, and wherein the first wireless node is different from the second wireless node.

32. The apparatus of claim 29, wherein the downlink transmission further comprises downlink data addressed to at least one wireless node of the plurality of wireless nodes, wherein the particular downlink frame comprises a downlink data frame, wherein the demarcation indication is included in the downlink data frame, and wherein a block acknowledgement request is included in the downlink data frame.

33. The apparatus of claim 32, wherein the downlink transmission further comprises an aggregated media access control protocol data unit (A-MPDU) that includes the block acknowledgement request, the downlink data frame, and the demarcation indication, wherein a first acknowledgement policy associated with the block acknowledgement request is set to no acknowledgement, and wherein a second acknowledgement policy associated with the downlink data is set to block acknowledgement.

34. The apparatus of claim 33, wherein at least one uplink transmission of the multiple uplink transmissions includes a block acknowledgement request.

35. The apparatus of claim 33, wherein the downlink transmission further comprises a block acknowledgement, a block acknowledgement request, downlink data, or a combination thereof.

36. An apparatus comprising:
means for receiving, from an access point, a downlink transmission comprising a demarcation indication of a start of a first uplink transmit opportunity, wherein the demarcation indication is piggybacked with a particular downlink frame in the downlink transmission; and means for transmitting an uplink transmission during the first uplink transmit opportunity, wherein the uplink transmission is sent to the access point after the downlink transmission is received, wherein the uplink transmission is transmitted concurrently with one or more additional uplink transmissions sent from one or more wireless nodes, wherein the uplink transmission and each of the one or more additional uplink transmissions include a media access control (MAC) header that includes a request for a second uplink transmit opportunity, wherein the uplink transmission and each of the one or more additional uplink transmissions comprises uplink data piggybacked with the request, wherein a network allocation vector (NAV) associated with the uplink transmission and the one or more additional uplink transmissions starts upon completion of transmission of the demarcation indication, wherein, responsive to the uplink transmission, the means for receiving a downlink transmission is configured to receive an acknowledgement of the uplink data of the uplink transmission, and wherein an allocation response is piggybacked with the acknowledgement.

37. The apparatus of claim 36, wherein the means for receiving the downlink transmission comprises means for receiving the downlink transmission sent via a spatial division multiple access (SDMA) scheme, and wherein the uplink transmission is transmitted simultaneously with the one or more additional uplink transmissions via the SDMA scheme.

38. The apparatus of claim 36, wherein the uplink transmission further comprises at least one acknowledgement of previously received downlink data, at least one block acknowledgement request, or a combination thereof.

39. The apparatus of claim 36, wherein the downlink transmission further comprises an aggregated media access control protocol data unit (A-MPDU) that includes the demarcation indication and the particular downlink frame, and wherein the particular downlink frame is a block acknowledgement frame.

40. A non-transitory computer readable medium encoded with instructions that, when executed by a processor, cause the processor to:
transmit, to a plurality of wireless nodes, a downlink transmission comprising a demarcation indication of a start of a first uplink transmit opportunity, wherein the demarcation indication is piggybacked with a particular downlink frame in the downlink transmission;

receive, responsive to the downlink transmission and during the first uplink transmit opportunity, multiple uplink transmissions concurrently from the plurality of wireless nodes, wherein the multiple uplink transmissions comprise a media access control (MAC) header that includes a request for a second uplink transmit opportunity, wherein each of the multiple uplink transmissions comprises uplink data piggybacked with the request, and wherein a network allocation vector (NAV) associated with the multiple uplink transmissions starts upon completion of transmission of the demarcation indication; and transmit, in response to the multiple uplink transmissions, an acknowledgement of the uplink data to each of the multiple uplink transmissions, wherein an allocation response is piggybacked with the acknowledgement.

41. A non-transitory computer readable medium encoded with instructions that, when executed by a processor, cause the processor to:
receive, from an access point, a downlink transmission comprising a demarcation indication of a start of a first uplink transmit opportunity, wherein the demarcation indication is piggybacked with a particular downlink frame in the downlink transmission;

transmit an uplink transmission during the first uplink transmit opportunity, wherein the uplink transmission is sent to the access point after the downlink transmission is received, wherein the uplink transmission is transmitted concurrently with one or more additional uplink transmissions sent from one or more wireless nodes, wherein the uplink transmission and each of the one or more additional uplink transmissions include a media access control (MAC) header that includes a request for a second uplink transmit opportunity, wherein the uplink transmission and each of the one or more additional uplink transmissions comprises uplink data piggybacked with the request, and wherein a network allocation vector (NAV) associated with the uplink transmission and the one or more additional uplink transmissions starts upon completion of transmission of the demarcation indication; and receive, in response to the uplink transmission, an acknowledgement of the uplink data of the uplink transmission, wherein an allocation response is piggybacked with the acknowledgement.

42. The method of claim 1, wherein the allocation response is included in a downlink data frame.

43. The method of claim 1, wherein the demarcation indication is included in a second MAC header associated with the particular downlink frame of the downlink transmission.

44. The method of claim 43, wherein the demarcation indication is indicated by a value of a granted number of spatial streams field in the second MAC header.

45. The method of claim 1, wherein the demarcation indication is aggregated with the particular downlink frame in an aggregated media access control protocol data unit (A-MPDU) of the downlink transmission.

46. The method of claim 1, wherein the particular downlink frame is a downlink data frame, and wherein the demarcation indication is included in the downlink data frame.

47. The method of claim 1, wherein the particular downlink frame is a block acknowledgement frame, and wherein the demarcation indication is included in the block acknowledgement frame.

48. The method of claim 1, wherein the particular downlink frame is a reverse direction grant frame, and wherein the demarcation indication is included in the reverse direction grant frame.

49. The method of claim 1, wherein the at least one uplink data transmission comprises an uplink data frame that includes the uplink data, wherein the request is included in the uplink data frame, and wherein a block acknowledgement request is included in the uplink data frame.

50. The method of claim 11, wherein the request comprises a single bit, and wherein a first number of transmissions sent during the first uplink transmit opportunity and a second number of transmission slots requested during the second uplink transmit opportunity are the same number.

* * * * *